US008868553B2

(12) United States Patent
Henderson et al.

(10) Patent No.: US 8,868,553 B2
(45) Date of Patent: Oct. 21, 2014

(54) SYSTEM AND METHOD TO ACQUIRE INFORMATION FROM A DATABASE

(75) Inventors: Daniel L. Henderson, Charlotte, NC (US); Elliott B. Lieberman, Oakland, CA (US); Charles M. Freschl, Walnut Creek, CA (US); Deni S. Soemeri, Forest Hills, NY (US)

(73) Assignee: Bank of America Corporation, Charlotte, NC (US)

( * ) Notice: Subject to any disclaimer, the term of this patent is extended or adjusted under 35 U.S.C. 154(b) by 1835 days.

(21) Appl. No.: 10/386,310

(22) Filed: Mar. 11, 2003

(65) Prior Publication Data

US 2004/0181513 A1    Sep. 16, 2004

(51) Int. Cl.
*G06F 17/30* (2006.01)
*G06Q 10/10* (2012.01)

(52) U.S. Cl.
CPC .......... *G06Q 10/10* (2013.01); *G06F 17/30893* (2013.01)
USPC ........... 707/736; 707/640; 707/674; 707/722; 707/791; 707/610

(58) Field of Classification Search
USPC ........... 707/100–104.1, 103 Y, 1–3, 610, 640, 707/674, 722, 736, 791; 709/219; 705/40–42
See application file for complete search history.

(56) References Cited

U.S. PATENT DOCUMENTS

| 5,220,501 | A * | 6/1993 | Lawlor et al. | 705/40 |
| 5,870,724 | A * | 2/1999 | Lawlor et al. | 705/42 |
| 6,202,054 | B1 * | 3/2001 | Lawlor et al. | 705/42 |
| 6,842,906 | B1 * | 1/2005 | Bowman-Amuah | 719/330 |
| 6,912,522 | B2 * | 6/2005 | Edgar | 707/2 |
| 2002/0013827 | A1 * | 1/2002 | Edstrom et al. | 709/219 |
| 2002/0152190 | A1 | 10/2002 | Biebesheimer et al. | |
| 2002/0198829 | A1 | 12/2002 | Ludwig et al. | |
| 2002/0198931 | A1 | 12/2002 | Murren et al. | |
| 2004/0054569 | A1 * | 3/2004 | Pombo et al. | 705/7 |

OTHER PUBLICATIONS

PCT Notification of Transmittal of the International Search Report and the PCT International Search Report dated Aug. 10, 2004 (International Application No. PCT/US04/07346).
PCT Written O pinion of t he I nternational S earching Authority dated Aug. 10, 2004 (International Application No. PCT/US04/07346).
European Patent Office, Supplementary Search Report, corresponding to European Patent Application No. 04718877.6, dated Jul. 24, 2008.
Saimi A. et al. "Presentation layer framework of Web application systems with server-side Java Technology" Computer Software and Applications Conference, 2000. COMPSAC 2000. The 24th Annual International Taipei. Taiwan Oct. 25-27, 2000, Los Alamitos, CA, USA, IEEE Comput. Soc. US., pp. 473-478.

(Continued)

*Primary Examiner* — Sana Al Hashemi
(74) *Attorney, Agent, or Firm* — Michael A. Springs; Moore & Van Allen PLLC; W. Kevin Ransom

(57) ABSTRACT

A system and method to retrieve information is disclosed. The system may include a processor to run a query application to retrieve selected information from one or more databases. The query application may include a client layer and a presentation layer to interface with the client layer. A database access layer may be provided and an interface layer may be provided to interface between the presentation layer and the database access layer.

32 Claims, 23 Drawing Sheets

(56) References Cited

OTHER PUBLICATIONS

European Office Action dated Dec. 28, 2012 for European Patent Application No. EP 04718877.6.
Canadian Office Action dated Apr. 20, 2012 for Application No. 2,518,609.
Saimi et al., "Presentation layer framework of web application systems with server-side Java technology", Computer software and applications conference, 2000, pp. 473-478, Oct. 25, 2000, ISBN: 978-0-7695-0792-7.
Taiwan Search Report for Application No. 093106241 dated Sep. 22, 2011.

* cited by examiner

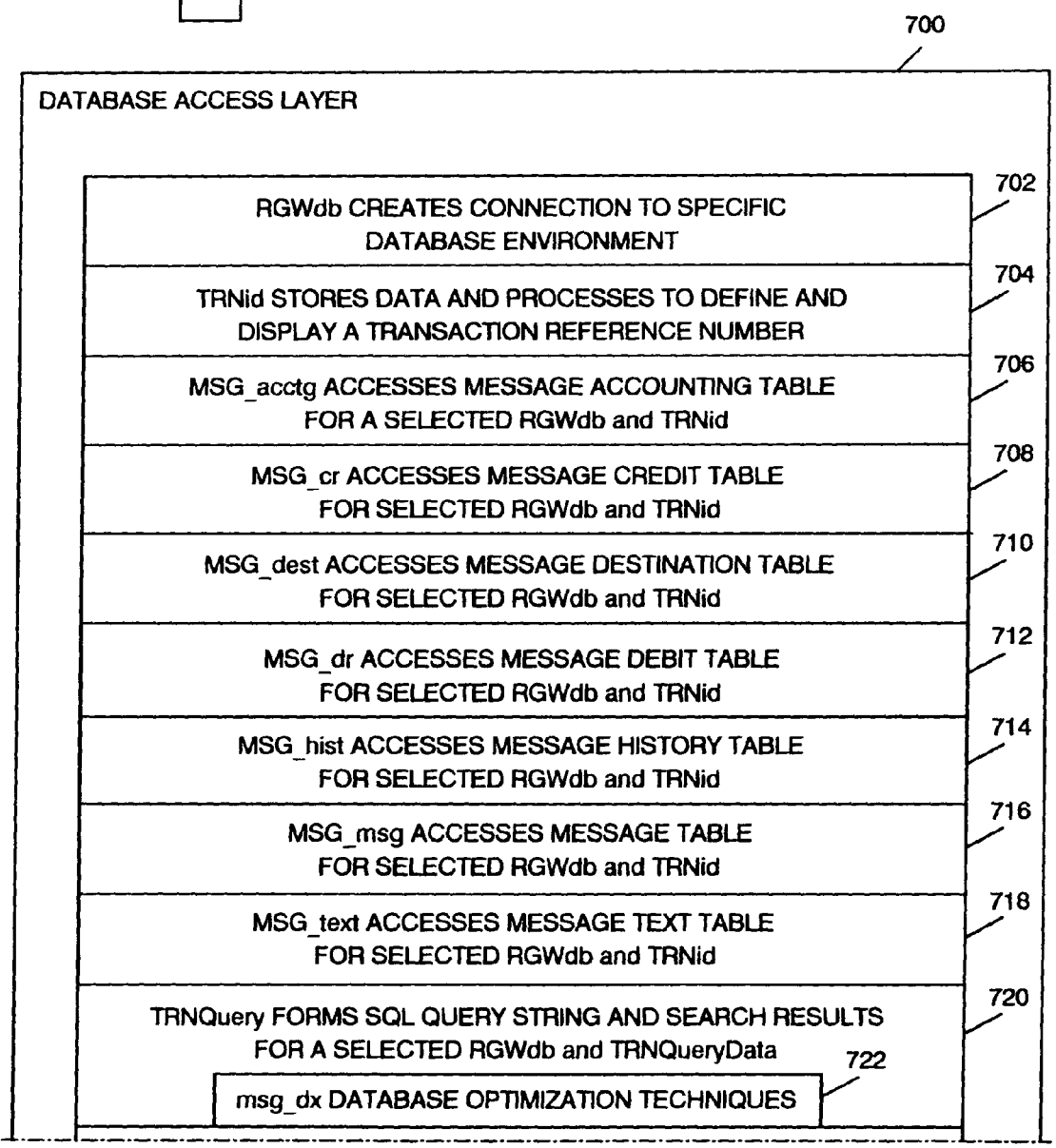

WIRE TRANSFER> QUERY (WTQ)
A GLOBAL TREASURY SERVICE APPLICATION

TRANSACTION SUMMARY

10 ITEM(S) FOUND DISPLAYING ITEMS 1 TO 10 ON PAGE 1 TO 1

| TRN REFERENCE# | SOURCE | DIRECTION | ENTITY | ACTIVITY | ADVICE | DEBIT ID | CREDIT ID | CURR | AMOUNT |
|---|---|---|---|---|---|---|---|---|---|
| 000001 | 1 | INCOMING | 1 | PAYMENT | Tr1 | DBT #1 | CDT #1 | USD | 0.01 |
| 000002 | 1 | INCOMING | 2 | PAYMENT | Tr2 | DBT #2 | CDT #2 | USD | 0.50 |
| 000003 | 1 | INCOMING | 3 | PAYMENT | Tr3 | DBT #3 | CDT #3 | USD | 50.00 |
| 000004 | 1 | INCOMING | 4 | PAYMENT | Tr4 | | | USD | 1.25 |
| 000005 | 1 | INCOMING | 5 | PAYMENT | Tr5 | DBT #5 | CDT #5 | | 200.00 |
| 000006 | 2 | BOOK | 6 | ADMIN | Tr6 | | | | 0.00 |
| 000007 | 2 | BOOK | 7 | ADMIN | Tr7 | | | | 0.00 |
| 000008 | 3 | BOOK | 8 | PAYMENT | WIR | DBT #6 | CDT #6 | USD | 1,000,000.00 |
| 000009 | 3 | BOOK | 9 | INCMPLT PYMT | WIR | DBT #7 | CDT #7 | EUR | 2.22 |
| 000010 | 2 | OUTGOING | 10 | INCMPLT PYMT | FED | DBT #8 | CDT #8 | JPT | 50.00 |

GO TO PAGE: 1

THE MANNER IN WHICH THE DATA IS DISPLAYED IS SPECIFIC TO THE PRESENTATION LAYER

ADMINISTRATION | HELP | ABOUT | LOG OFF
WIRE TRANSFER QUERY (WTQ)

FIG. 16

SYSTEM AND METHOD TO ACQUIRE INFORMATION FROM A DATABASE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to computer systems and databases, and more particularly to a system and method to acquire information, such as financial transaction information or the like, from a database or multiple databases.

BACKGROUND

The Internet has become a widely used tool for accessing information contained in databases or other data storage medium. Intranets or private networks are also widely used by companies to provide secure access to information by the company's employees and under some circumstances, customers or other authorized individuals may be given secure access to selected information or databases that are maintained or provided by the company. There are various technologies and software applications available to access databases over the Internet, intranets or the like. Such applications are typically a conglomeration of complex data structures and routines that make them difficult to maintain and enhance as technological advances are made. These applications are also typically "one size fits all" and are not configurable on a per user, per user group or per system basis. This prevents any form of user customization and dynamic control. Additionally, the methods of data access in such applications can be fixed and cannot be changed. This prevents any control over the data access methods and the ability to expand and enhance performance by using data query optimization. The applications may also be required to operate on proprietary server designs and may therefore be limited to specific hardware and software operating system environments. Because of inherent limitations to certain server designs, applications may not be scalable to a large number of concurrent users per server. One application for accessing financial transaction information, referred to as MTQ by the Bank of America Corporation, is subject to the foregoing problems.

Accordingly, there is a need to provide a system and method to acquire information from a database that is easily maintainable and can be enhanced to meet technological advances and changes in database structures. There is also a need to provide a system and method to acquire information from a database that is configurable and permits control over the data access methods. There is a further need to provide a system and method to acquire information from a database that is not limited to specific hardware and operating systems and is scalable for any number of concurrent users.

SUMMARY

In accordance with an embodiment of the present invention, a system to retrieve information may include a processor to run a query application to retrieve selected information from one or more databases. The query application may include a client layer and a presentation layer to interface with the client layer. An interface layer may interface between the presentation layer and a database access layer.

In accordance with another embodiment of the present invention, a system to retrieve information may include an application server and an Internet type server to interface between a browser and the application server, wherein the Internet type server is other than a common gateway interface (CGI) server. A query application may be provided to run on the application server.

In accordance with another embodiment of the present invention, a method to retrieve information may include presenting an input query page to a user to enter different search parameters. A query data object may be formed in response to the search parameters entered by the user and a search of one or more databases may be executed based on the query data object. The results of the search may then be presented to the user.

In accordance with another embodiment of the present invention, a method to retrieve information may include accessing a query application on a processor to retrieve selected information from one or more databases. The query application may include a client layer, a presentation layer to interface with the client layer; and a database access layer.

In accordance with a further embodiment of the present invention, a computer-readable medium having computer-executable instructions may be provided for performing a method that may include presenting an input query page to a user to enter different search parameters. A query data object may be formed by the method in response to the search parameters entered by the user and a search of one or more databases may be executed based on the query data object. The results of the search may be presented to the user.

BRIEF DESCRIPTION OF THE DRAWINGS

FIG. 14 is an exemplary GUI, web page or screen shot of a query input form page that may be generated by a WTQ application in accordance with an embodiment of the present invention.

FIG. 15 is an exemplary GUI, web page or screen shot of a transaction summary page that may be generated by a WTQ application in accordance with an embodiment of the present invention.

FIG. 16 is an exemplary GUI, web page or screen shot of a transaction detail page that may be generated by a WTQ application in accordance with an embodiment of the present invention.

DESCRIPTION OF THE INVENTION

The following detailed description of preferred embodiments refers to the accompanying drawings which illustrate specific embodiments of the invention. Other embodiments having different structures and operations do not depart from the scope of the present invention.

Figure 1:
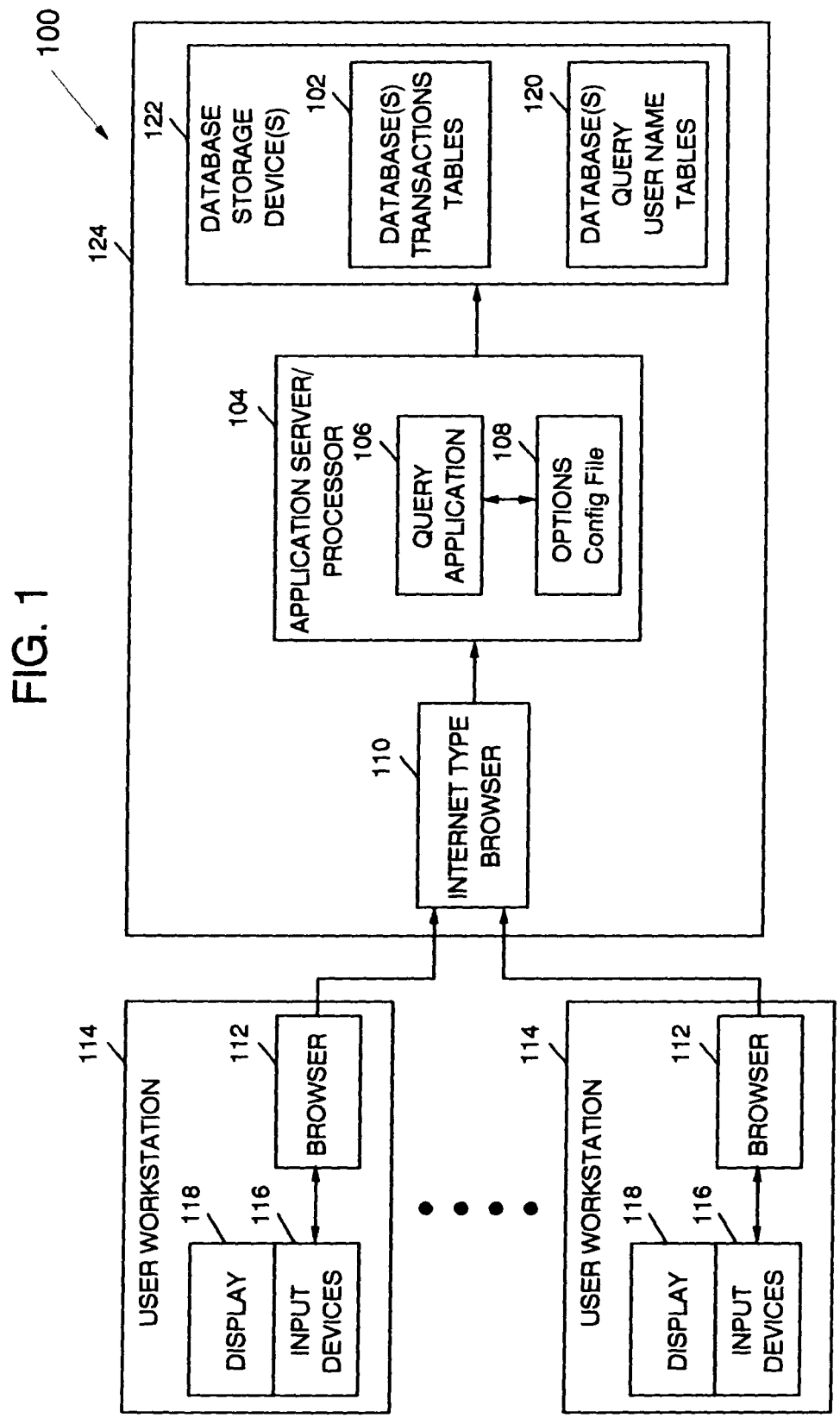
FIG. 1 is an example of a system to obtain information from one or more databases in accordance with an embodiment of the present invention.

FIG. 1 is an example of a system 100 to obtain information from one or more databases 102 in accordance with an embodiment of the present invention. The system 100 may include an application server or processor 104 on which a query application 106 may run or operate. The query application 106 may be a wire transfer query application to access or obtain financial transaction information from the database 102 or any query application to obtain any sort of information from a relational database or the like. The query application 106 may be stored in a memory forming part of the application server 104 or may reside on a separate memory or data storage device (not shown in FIG. 1). An Options Configuration file 108 may be associated with the query application 106 to customize the query application 106 for different users, user groups or systems. As will be described in more detail below, selected fields of an input query form or web page and fields of output web pages may be configured as well as other parameters associated with the query application 106. The Options Configuration file 108 may store the different configurations for different users and may be accessed to recall a particular configuration when a user associated with that configuration logs onto the system 100 or accesses the query application 106.

The application server 104 may be coupled to an Internet type server 110. The Internet type server 110 may be a Java 2 Platform Enterprise Edition (J2EE) server or a similar type server other than a common gateway interface (CGI) server. The server 110 and application server 104 may be an IBM WebSphere® application server or similar server.

The Internet type server 110 may interface between the application server 104 or query application 106 and a browser 112 on a user workstation 114. The workstation 114 may also include input devices 116, such as a keyboard and mouse, and a display 118. As will be described in more detail below, a user may use the input devices 116 to access and interact with the query application 106 via the browser 112 and display web pages generated by the query application on the display 118. Multiple user workstations 114 may access the query application 106 simultaneously via the Internet type server 110.

As part of the logon process, the query application 106 may access one or more databases 120 containing user name tables to compare a user name entered by a user to those listed in the tables to determine if the user is an authorized user. The database or databases 102 that may contain transaction/message tables or the like and the databases 120 may be stored on a database storage device 122 or memory. The databases 102 and 120 and the servers 104 and 110 may be part of a system server 124. Alternatively, the databases 102 and 120 may be separate or remote from the system server 124.

Figure 2:
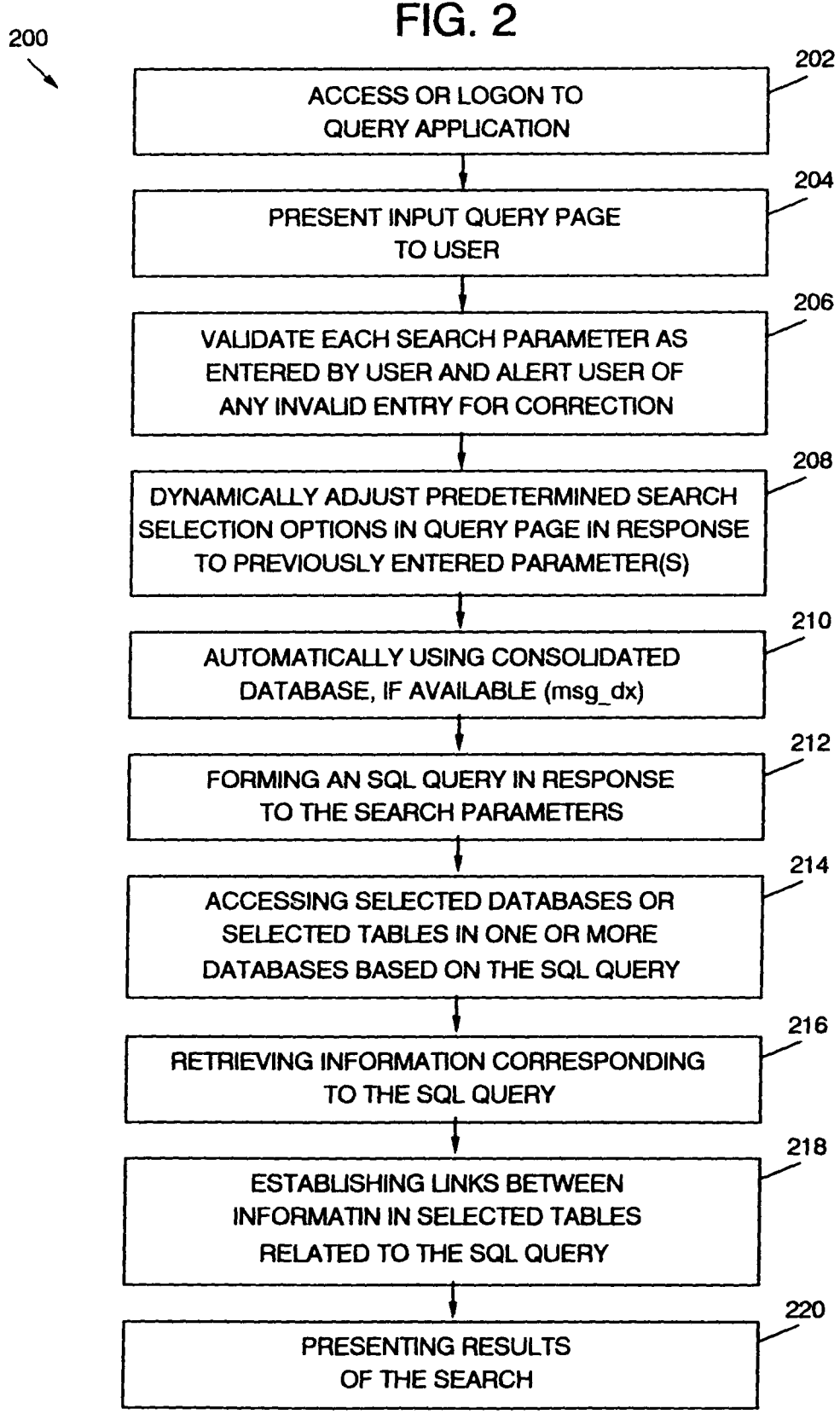
FIG. 2 is a flow chart of a method to obtain information from a database in accordance with the present invention.

FIG. 2 is a flow chart of a method 200 to obtain or access information from a database, similar to the database 102 of FIG. 1, in accordance with the present invention. The method 200 may be embodied in the query application 106 of FIG. 1. In block 202, a user may access or logon to the query application. As previously described, the system may validate the user's credentials to verify that the user is authorized. In block 204, an input query page may be presented to the user for the user to enter search parameters. Each search parameter may be validated by the query application as the user enters the parameter in block 206. The user may be alerted of any invalid entry and provided an opportunity to correct the entry in block 206. In block 208, predetermined search selection options in the input query page may be dynamically adjusted or modified in response to parameters previously entered in the page by the user. For example, if the user is only interested in transactions that took place on a particular transfer processing system and selected this particular system. Then in a subsequent selection option for banks, only those banks, legal entities or institutions whose transactions are processed on that particular system will be provided for selection by the user.

If a consolidated database may be searched or accessed based on the search parameters entered by the user, the method 200 may automatically use the consolidated database in block 210. An indicator, such as a msg_dx indicator in block 210, may signal the software or method 200 that a consolidated database is available and may be used in the query process (msg_dx true) or to perform a table join of multiple tables in the query process (msg_dx false). Consolidated databases may be formed that include information from multiple different databases or tables that may be accessed on a recurring basis. Accordingly, computational resources and time can be saved by accessing the consolidated database as opposed to searching multiple different databases.

In block 212, a structured query language (SQL) query may be formed in response to the search parameters. In block 214, selected databases or selected tables may be accessed or searched based on the SQL query or queries. The information corresponding to the SQL query may be retrieved in block 216. Alternatively or additionally, links may be established between the information in the selected tables based on or related to the SQL query or queries in block 218. The search results may be presented to the user in block 220. The search results may be presented to the user in different forms as will be described below and the system may be adapted to enable the user to configure the format of the web pages for presenting the results.

Figure 3:
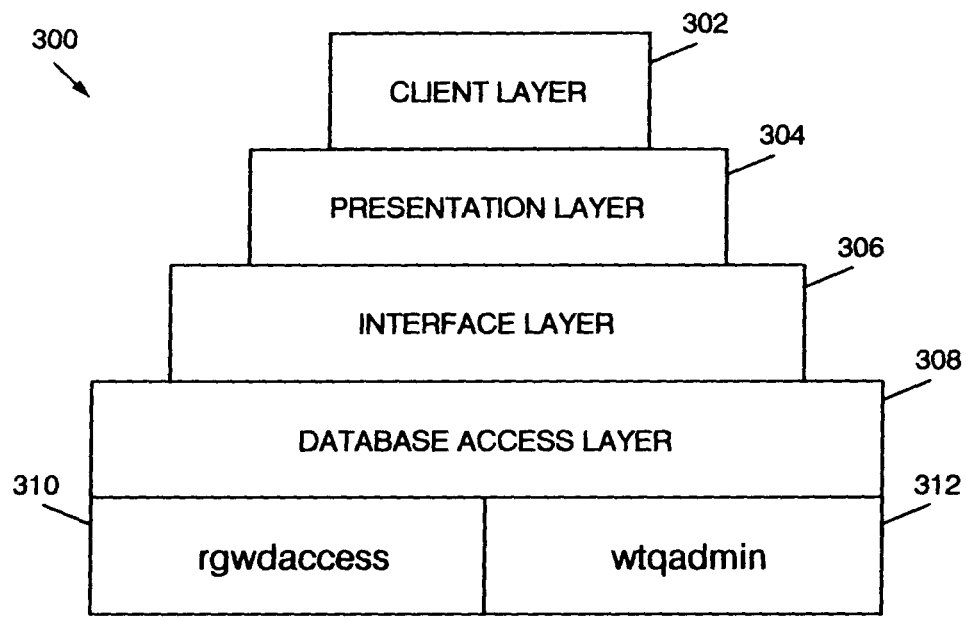
FIG. 3 is an illustration of a structure of a query application that may embody a method to obtain information from a database in accordance with an embodiment of the present invention.

FIG. 3 is an illustration of a structure 300 of a query application, such as the query application 106 of FIG. 1, that may embody a method, similar to method 200 of FIG. 2, to obtain information from a database in accordance with an embodiment of the present invention. The structure 300 may include a client layer 302 and a presentation layer 304 that interfaces with the client layer 302. An interface layer 306 may interface between the presentation layer 304 and a database layer 308. The database layer 308 may be further separated into a relational data store access or relational gateway database access (rgwdaccess) component 310 and a wire transfer query administration (wtqadmin) component 312. The structure 300 may be divided into separate layers to reduce complexity, facilitate maintainability and to permit configuration or modification of the different layers without affecting the others. Accordingly, components within each of the different layers may be modified or enhanced to adjust to different users, user groups or systems, or to adjust to different database organizations and operating systems. Any modified or enhanced layer should still be able to interface and operate properly with other layers that may not have been modified.

Figure 4:
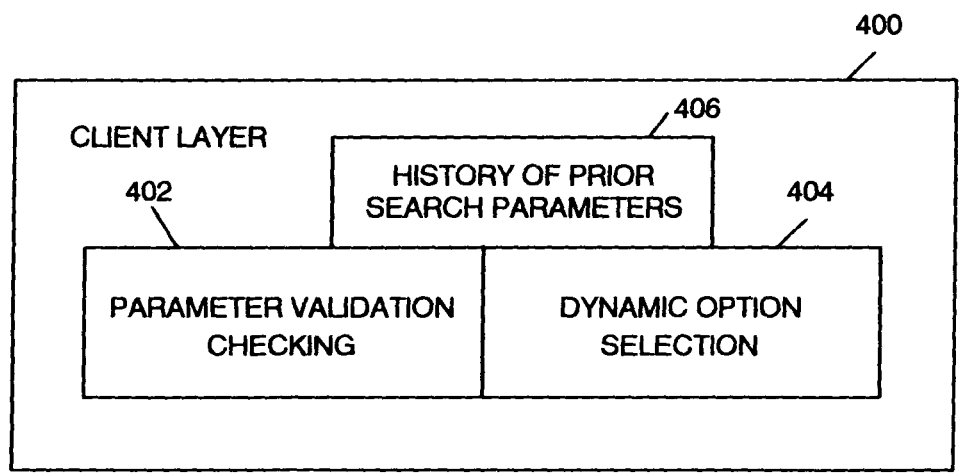
FIG. 4 is an illustration of exemplary elements that may form a client layer of a query application in accordance with an embodiment of the present invention.

FIG. 4 is an illustration of exemplary elements or data structures that may form a client layer 400 of a query application in accordance with an embodiment of the present invention. The client layer 400 may be the same as the client layer 302 of FIG. 3. The client layer 400 may use client-side JavaScript for screen or GUI validations and the JavaScript code may be embedded in Java Server Page (JSP) files. The client layer 400 may include a parameter validation checking element or data structure 402. The parameter validation checking element 402 may check to confirm that any search parameters or other parameters entered by a user are valid parameters. The element 402 may alert the user if an invalid parameter is entered and prompt the user to enter a correct parameter or provide a list of options for the user to select a correct parameter.

The client layer 400 may also include a dynamic option selection element 404. This element dynamically adjusts or modifies predetermined search selection options in response to one or more search parameters previously entered by the user. Accordingly, as a user enters a parameter or selects a particular parameter from a list, subsequent selection options may be modified to provide only those options that are valid in combination with the previous selections or entries, similar to block 208 in FIG. 2.

The client layer 400 may also include an element 406 to store or retain a history of a prior set of search parameters. A user may then go back to the original set of search parameters and change selected parameters to conduct additional searches.

Figure 5:
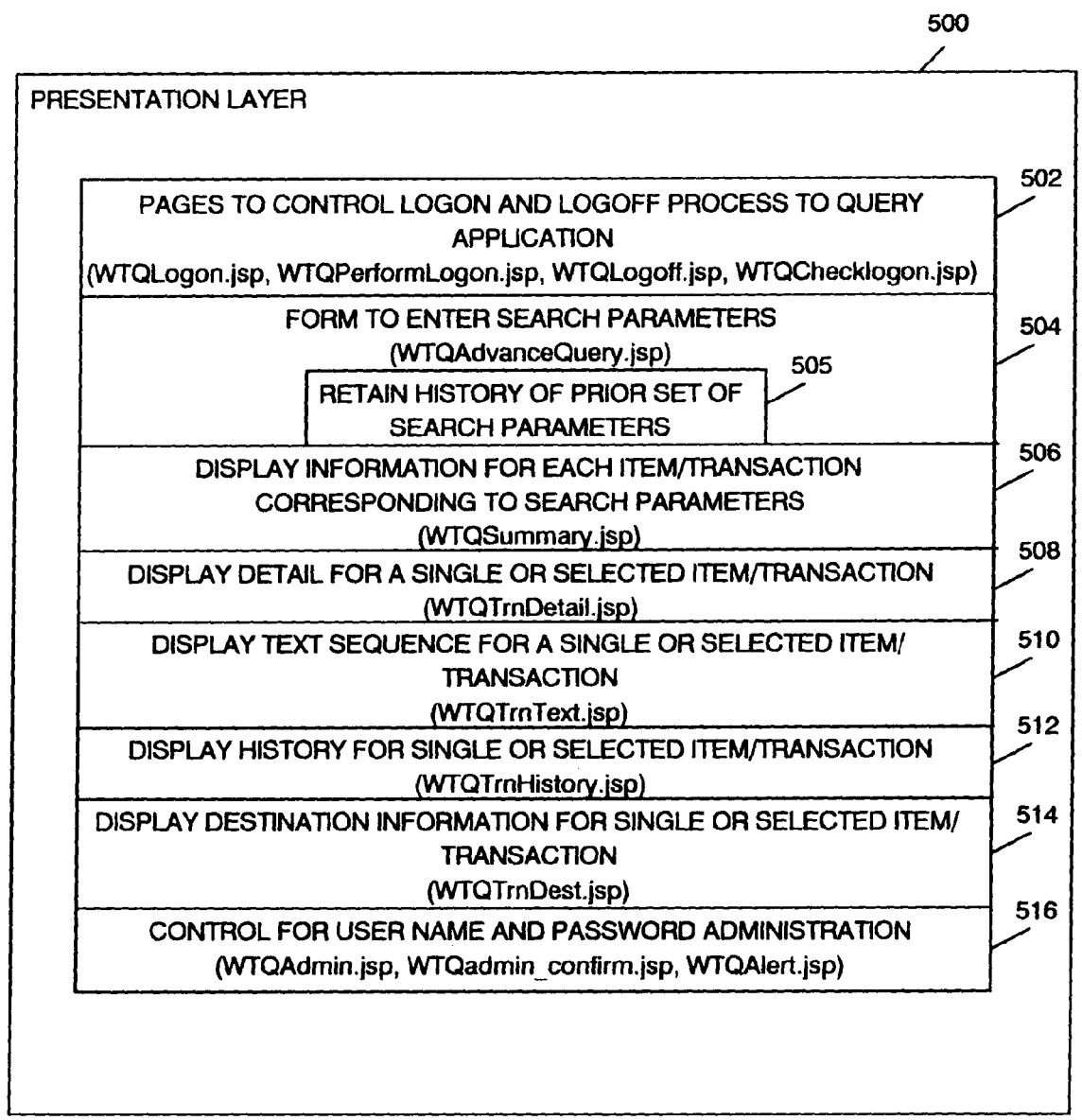
FIG. 5 is an illustration of an exemplary presentation layer of a query application in accordance with an embodiment of the present invention.

FIG. 5 is an illustration of an exemplary presentation layer 500 of a query application in accordance with an embodiment of the present invention. The presentation layer 500 may be the same as the presentation layer 304 in FIG. 3. The server-side presentation layer 500 may be coded as a JavaServer Page (JSP). Each JSP file of the presentation layer 500 may define a page format and processing logic for a query input form or forms and output pages. The application server 104 (FIG. 1) may compile each JSP at runtime into a Java servlet. A servlet is executable code that runs in the context of the application server 104 and extends the servers capability. The servlet may generate HyperText Markup Language (HTML) files that the web or Internet type server 110 may transmit to the user workstation 114. The browser 112 may render the HTML pages onto the workstation display 118 and allow the user to input into or manipulate the different forms or pages shown as examples in FIG. 5. The presentation layer 500 may generate and display Java Server Pages 502 to control a logon and logoff process to the query application. Page or form 504 may be generated and displayed for a user to enter search parameters. A history of a prior set of search parameters may be retained in the block 505 of the presentation layer 500. The prior parameters history may be stored as a function of a Java Server Page, WTQAdvanceQuery.jsp that also generates the input form for the search parameters in block 504. A page or pages 506 may display information for each item or transaction corresponding to the search parameters entered by the user. Page 508 may display details for a single item or transaction or a selected item or transaction from page 506. Page 510 may display a text sequence for a single or selected item or transaction and page 512 may display a history for a single or selected item or transaction. Page 514 may display destination information for a single or selected transaction and page 516 may be used to control user name and password administration.

Figure 6:
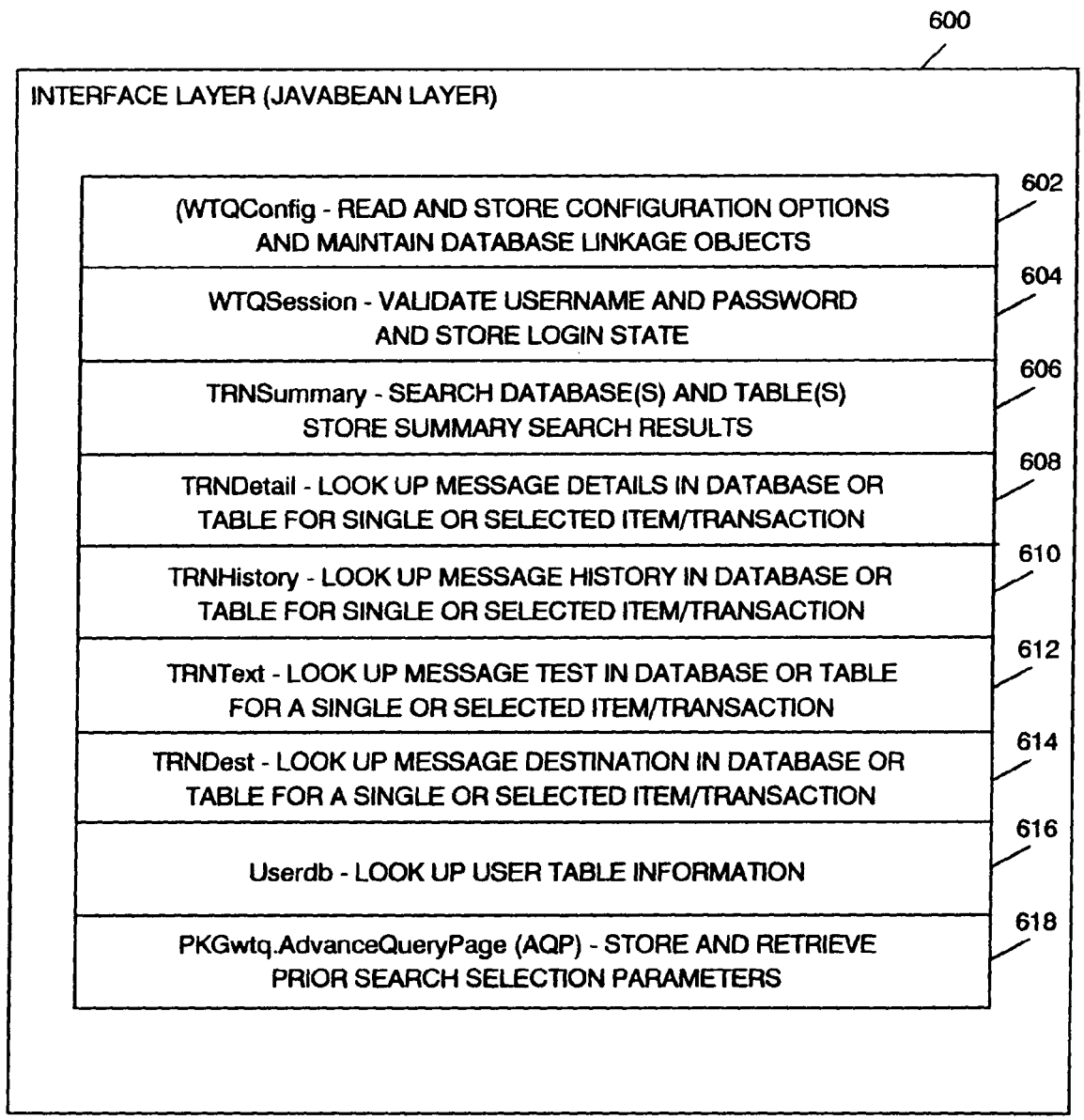
FIG. 6 is an illustration of exemplary elements that may form an interface layer of a query application in accordance with an embodiment of the present invention.

FIG. 6 is an illustration of exemplary elements that may form an interface layer 600 of a query application in accordance with an embodiment of the present invention. The interface layer 600 may be the same as the interface layer 306 in FIG. 3. The interface layer 600 may be a JavaBean layer and include server-side JavaBean elements or classes to provide context for execution of the JavaServer Pages (JSPs) of the presentation layer 500. The JavaBean classes may remove complex logic from the JSPs or simplify the JSPs for improved maintainability. The JavaBean classes may also store information that may be used across different pages of the presentation layer 500, and the JavaBean classes may also interface with the database access layer 308 (FIG. 3) as previously described. The scope of a JavaBean may be for an entire application, for a single session or for a single page. Examples of JavaBeans for a wire transfer query (WTQ) application are illustrated in FIG. 6. A JavaBean 602 that may be designated WTQConfig may be provided to read and store configuration options and maintain database linkage objects. The scope of the WTQConfig JavaBean 602 may be for an entire application. A JavaBean 604 that may be designated WTQSession may be provided to validate usernames and passwords and to store a login state for a session. A JavaBean 606 named TRNSummary may be provided to search different databases and store transaction summary search results. The scope of the TRNSummary JavaBean 606 may be for a session. A TRNDetail labeled JavaBean 608 may be provided to look up transaction message detail information or any information about a transaction in a database or table for a single or selected transaction. A JavaBean 610 that may be named TRNHistory may be provided to look up transaction history message information in a database or table for a single or selected transaction. A TRNText named JavaBean 612 may be provided to look up message text information in a database or table for a single or selected transaction. A JavaBean 614 that may be labeled TRNDest may be provided to look up message destination information in a database or table for a single or selected transaction. The scope of the TRNDetail 608, TRNHistory 610 and TRNText 612 JavaBeans may be for a single page. A userdb designated JavaBean 616 may be provided to look up user table information. The scope of the userdb JavaBean 616 may be for a single session. A JavaBean 618 that may be designated PKGwtq.AdvanceQuery Page may hold prior search parameters. Operation of JavaBeans in the interface or JavaBean layer 600 in coordination with the database access layer 308 will be discussed in more detail with reference to FIGS. 8 and 11A, 11B, 11C, and 11D.

Figure 7B:
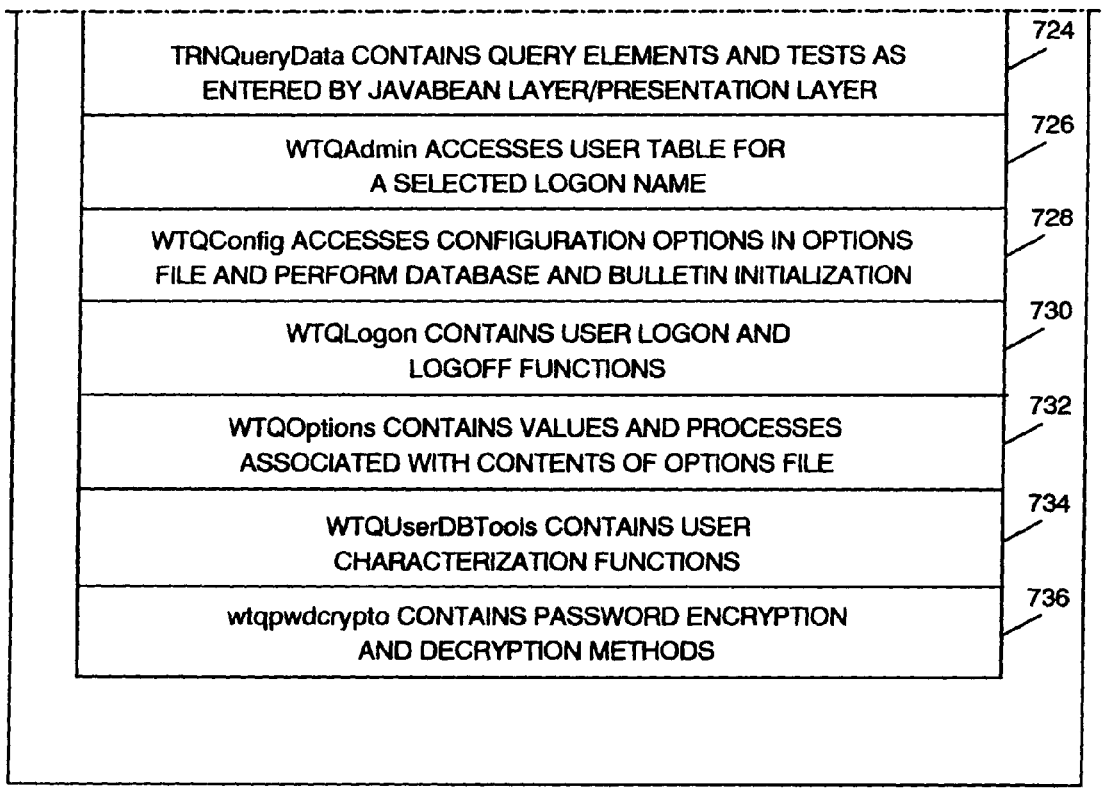
FIGS. 7A and B are an illustration of exemplary elements that may form a database access layer in accordance with an embodiment of the present invention.

FIGS. 7A and B are an illustration of exemplary elements that may form a database access layer 700 in accordance with an embodiment of the present invention. The database access layer 700 may be the same as the database access layer 308 in FIG. 3. The database access layer 700 may include a plurality of different data access classes or data structures as shown in FIG. 7 to provide access for the interface or JavaBean layer 600 to selected databases or selected tables within databases. The data access classes may provide Java Database Connectivity (JDBC) data access for the JavaBean or interface layer 600 into remote relational gateway (RGW) databases or relational data stores. The class RGWdb 702 may create connections to a specific database environment. TRNid 704 may store data and processes to define and display a transaction reference number on the display 118 of a user workstation 114 (FIG. 1). The classes MSG_acctg 706, MSG_cr 708, MSG_dest 710, MSG dr 712, MSG_hist 714, MSG_msg 716 and MSG_text 718 may provide access to different types of message tables as indicated in FIG. 7 for a selected database environment and transaction reference number. TRNQuery 720 may form SQL query strings based on the search parameters entered by the user and may retrieve the search results corresponding to the query strings for the selected database environment. The TRNQuery 720 may include a database optimization technique 722. The database optimization technique may include consolidating information from multiple databases in one database to minimize search times or computational overhead. The consolidated information may be information searched on a recurring basis or information grouped together for some other reason. An indicator, such as msg_dx, may be provided to identify that a consolidated database or table is available (msg_dx true) or to perform a table join of multiple tables (msg_dx false). The query application may automatically search the consolidated database or table in response to the msg_dx indicator.

TRNQueryData 724 may contain query elements and tests as entered by the JavaBean or Interface layer 600 and the presentation layer 500. WTQAdmin 726 may provide access to a user table, such as user table 120 in FIG. 1, for a selected logon name. WTQConfig 728 may provide access to configuration options in an options file and perform database and bulletin initialization. WTQLogon 730 may contain user logon and logoff functions. WTQOptions 732 may contain values and processes associated with the contents of the options file. WTQUserDBTools 734 may contain user characterization functions. The class wtqpwdcrypto 736 may contain password encryption and decryption methods.

Figure 8:
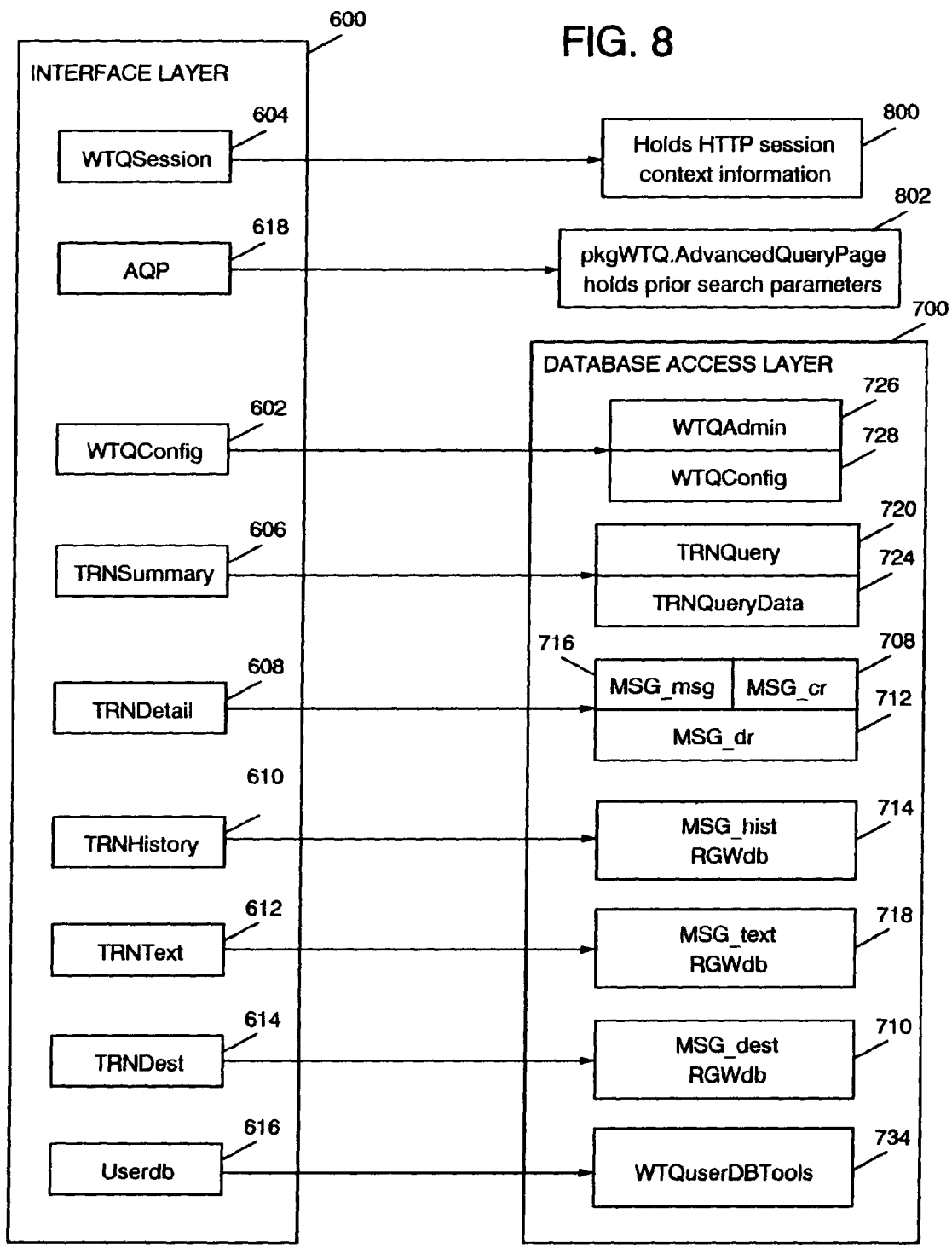
FIG. 8 is an illustration of how an exemplary interface layer may interface with a database access layer in accordance with an embodiment of the present invention.

FIG. 8 is a illustration of how the exemplary interface or JavaBean layer 600 of FIG. 6 may interface with the database access layer 700 of FIG. 7 in accordance with an embodiment of the present invention. As previously discussed, the interface layer 600 may include a plurality of elements or JavaBeans 604-616. Each of the elements 604-616 may be linked to selected message tables or transactional information tables corresponding to the data access classes 708-734 that may be in different databases in response to search parameters entered by the user in the presentation layer 500 (FIG. 5). The interface layer 600 may operate in coordination with the database access layer 700 to retrieve or link to the selected transaction information as shown in FIG. 8.

The element or JavaBean designated as WTQSession 604 in the interface layer 600 may also hold or link to hypertext transport protocol (HTTP) session context information as illustrated in block 806 of FIG. 8. The JavaBean designated as AdvancedQueryPage (AQP) 618 may hold or link to prior search parameters as indicated by block 802 in FIG. 8.

Figure 9:
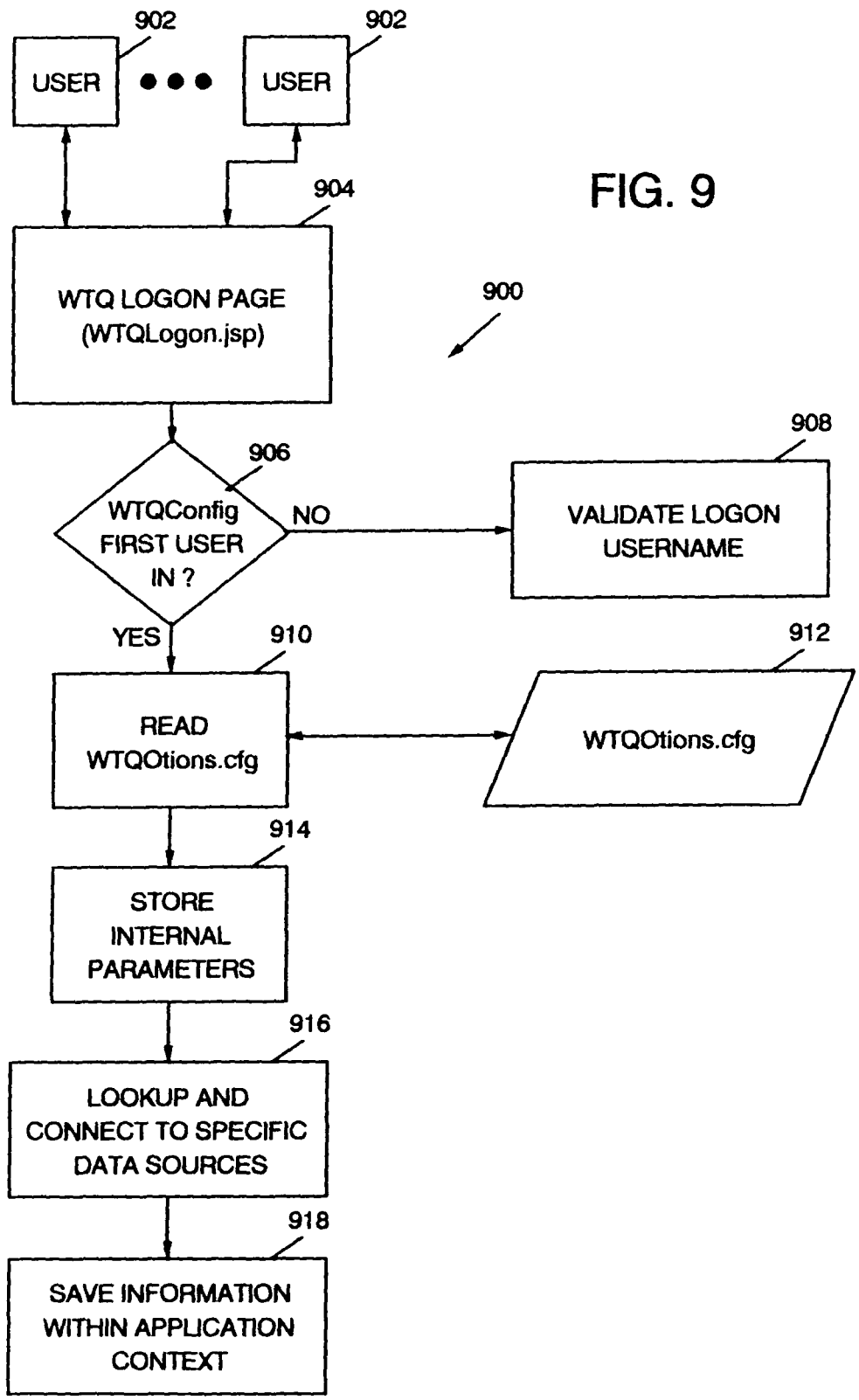
FIG. 9 is a flow chart of a method to initialize a query application, such as a wire transfer query (WTQ) application, in accordance with an embodiment of the present invention.

FIG. 9 is a flow chart of a method 900 to initialize a query application, such as a wire transfer query (WTQ) application, in accordance with an embodiment of the present invention. WTQ application initialization may occur in the context of the WTQConfig JavaBean 602 (FIG. 6). This bean may be accessible application wide by all user hypertext transfer protocol (HTTP) query sessions. The initialization method 900 may be a Java synchronous method that maintains a semaphore or flag that denotes the initialization state. After a first user 902 logs onto the system at the WTQ Logon Page 904, a determination may be made in block 906 if the user is the first user to log onto the system. If the response in block 906 is no, the logon username may be validated in block 902. If the response in block 906 is yes, the WTQOption.cfg file 912 may be read in block 910 and the file contents may be copied to a local object stored within the bean in block 914. In block 916, further methods may be called that open external connections to two primary databases, the RGW message tables and the WTQ user tables. In block 918, database objects that provide the context for SQL statements may be created and stored within the WTQConfig bean. The design anticipates database objects for multiples of RGW and WTQ user tables. Multiple database objects may be used for dynamically balancing user requests over geographically separate databases.

Figure 10:
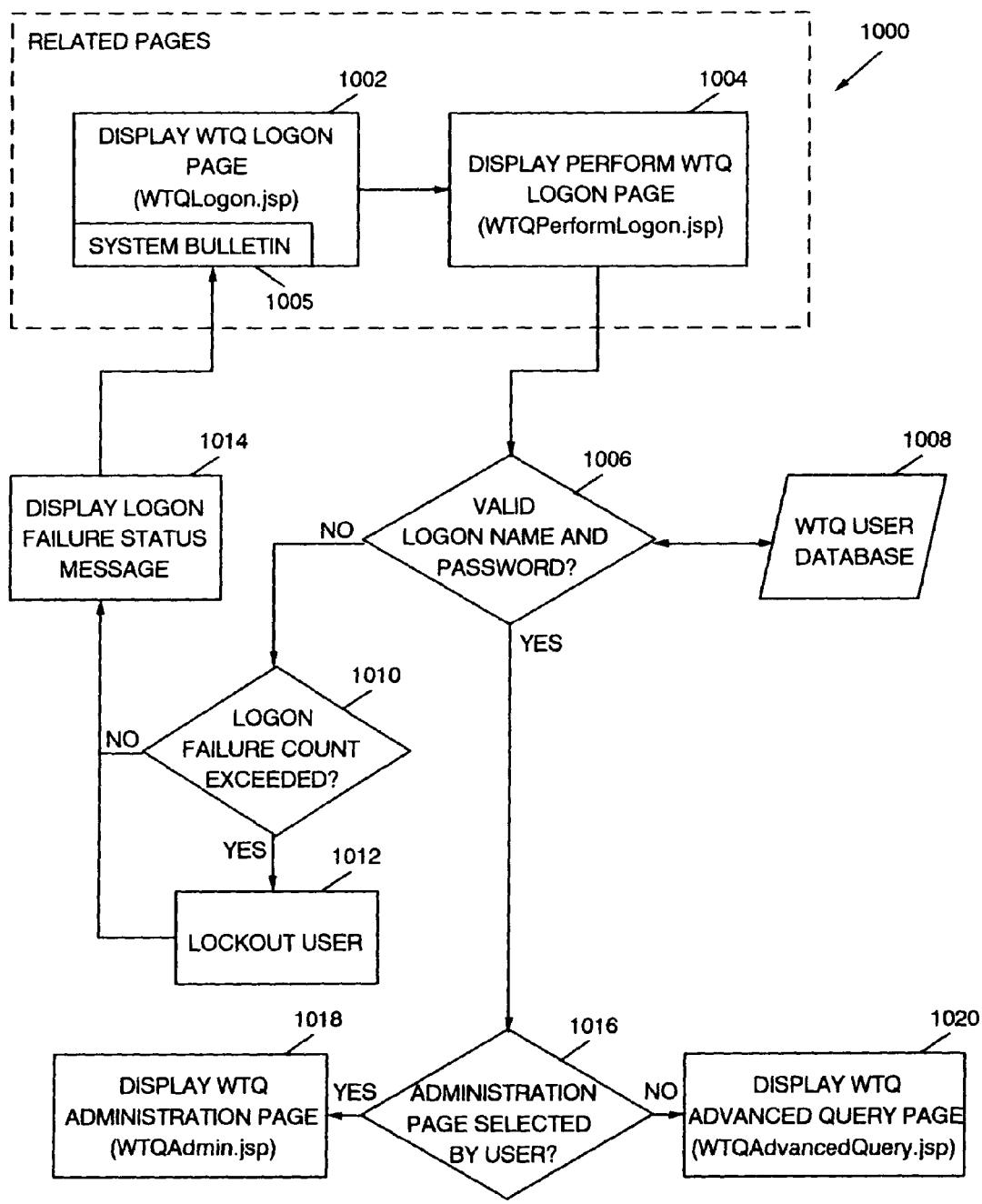
FIG. 10 is a flow chart of a method to log onto a query application, such as a WTQ application, in accordance with an embodiment of the present invention.

FIG. 10 is a flow chart of a method 1000 to logon to a query application 104 (FIG. 1), such as a WTQ application or the like, in accordance with an embodiment of the present invention. The logon and logoff process may be done within a user's HTTP query session context. This context may be the WTQSession JavaBean 604 in the interface or JavaBean layer 600 in FIG. 6. In block 1002, a WTQLogon.jsp Java Server Page, such as page 502 in the presentation layer 500 (FIG. 5), may be presented to the user. The page may include a standard HTML input for logon name and password built within a HTML form. A perform WTQ logon page may be displayed in block 1004 and execution of the form may be done within a Java Server Page, WTQPerformLogon.jsp, in the presentation layer 500. When a user's browser 112 (FIG. 1) accesses the WTQ application as the query application 106 in FIG. 1, the WTQ application universal resource locator (URL) may point to WTQLogon.jsp and as such the logon page will be the first page the user sees when accessing the WTQ application. An example of a WTQLogon.jsp screen or GUI is shown in FIG. 13.

Figure 13:
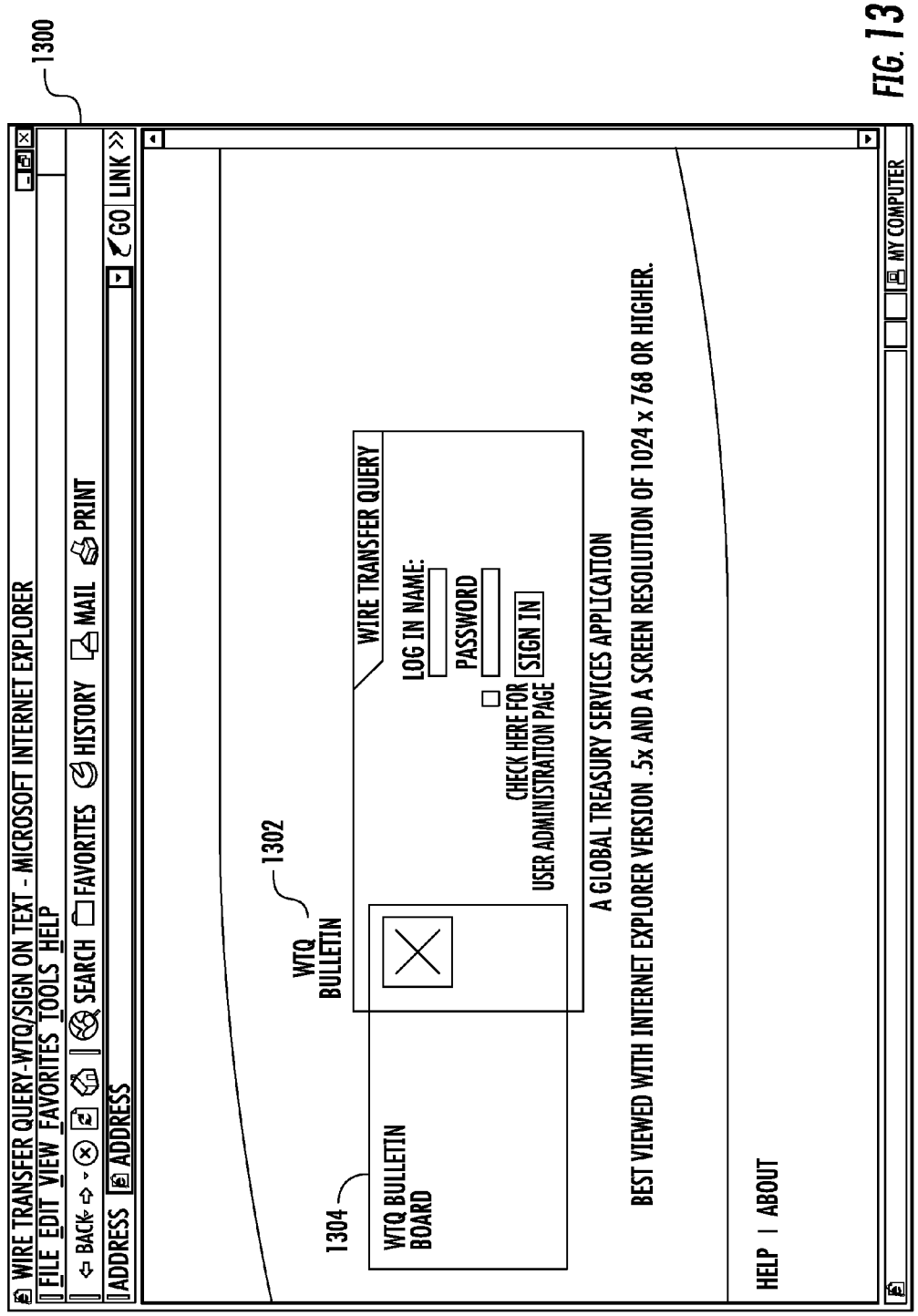
FIG. 13 is an exemplary GUI, web page or screen shot of a logon page that may be generated by a WTQ application in accordance with an embodiment of the present invention.

A system bulletin mechanism 1005 (FIG. 10) may be provided that may be built around an indicator icon 1302 in FIG. 13. A separate bulletin window 1304 that may be superimposed in a portion of the logon page 1300 as shown in phantom in FIG. 13. The bulletin window 1304 may be opened and closed by clicking on the icon 1302 or the close symbol in the window 1304. The window open/close logic may be contained in a WTQLogonPageJavaScriptLibrary.js contained in the client layer 302 (FIG. 3). The text displayed inside the window may come from a text file on a host server system, such as system 124 in FIG. 1. The text file specification may be specified as a parameter in the WTQOption.cfg file which may be the same as Options Config file 108 in FIG. 1. Logic may be provided in the system 100 to manipulate the visual indicator icon to denote when a new bulletin has been posted. The graphical manipulation may signal the users to read the contents of the bulletin.

Referring back to FIG. 10, WTQPerformLogon.jsp in block 1004 may contain the logic control to verify the user logon parameters as well as being a dispatch point for user administration functions. Verification of the user logon parameters may be done by calling a logon procedure within the wtqadmin Java class 824 in the data access layer 800. In block 1006, the procedure may control the database query logic that 1) verifies that the logon username exists and 2) whether the password entered by the user matches the password for that particular user stored in a WTQ USER database or table 1008. Appropriate Data Encryption Standard (DES) level encryption techniques may be employed when storing and retrieving password information. If the response in block 1006 is no, the logon procedure 1000 may advance to block 1010 and a determination may be made if a logon failure count has been exceeded. If the logon failure count has been exceeded in block 1010, the user may be locked out in block 1012. If the logon failure count in block 1010 has not been exceeded, a logon failure status message may be displayed to the user in block 1014. From block 1014, the method 1000 may return to block 1002 and the WTQ logon page may be displayed.

If the logon name and password are determined to be valid in block 1006 and the logon is successful, local variables contained in session context may be updated to note a successful logon. These variables may be used elsewhere within WTQ for display and validation processing. For example, because all JSP's have a unique URL, a logon validation check process must be called in each page (subsequent to WTQLogon.jsp) as a means to prevent users from bypassing the user logon. This mechanism may be incorporated inside WTQCheckLogon.jsp in block 502 of the presentation layer 500 (FIG. 5) and may rely on the variables set in local session context.

Upon a successful logon in block 1006, a determination may be made in block 1016 if an administration page has been selected by the user. If the user has selected the administration page in block 1016, a WTQ administration page 1018 may be displayed to the user and the user may conduct administrative functions, such as adding, deleting or changing usernames and passwords or other administrative functions. If the user has not selected the administrative page in block 1016, control may be passed to WTQAdvancedQuery.jsp, block 504 in the presentation layer 500 (FIG. 5) and a WTQ advanced query page may be displayed in block 1020. Following internal security standards, a mechanism may exist to inform a user that their password will shortly expire or has expired. On password expiration or by user selection, control may be dispatched to WTQAdmin.jsp, block 516 in the presentation layer 500 and the WTQ administration page may be displayed to allow the user to choose a new password.

Figure 14:
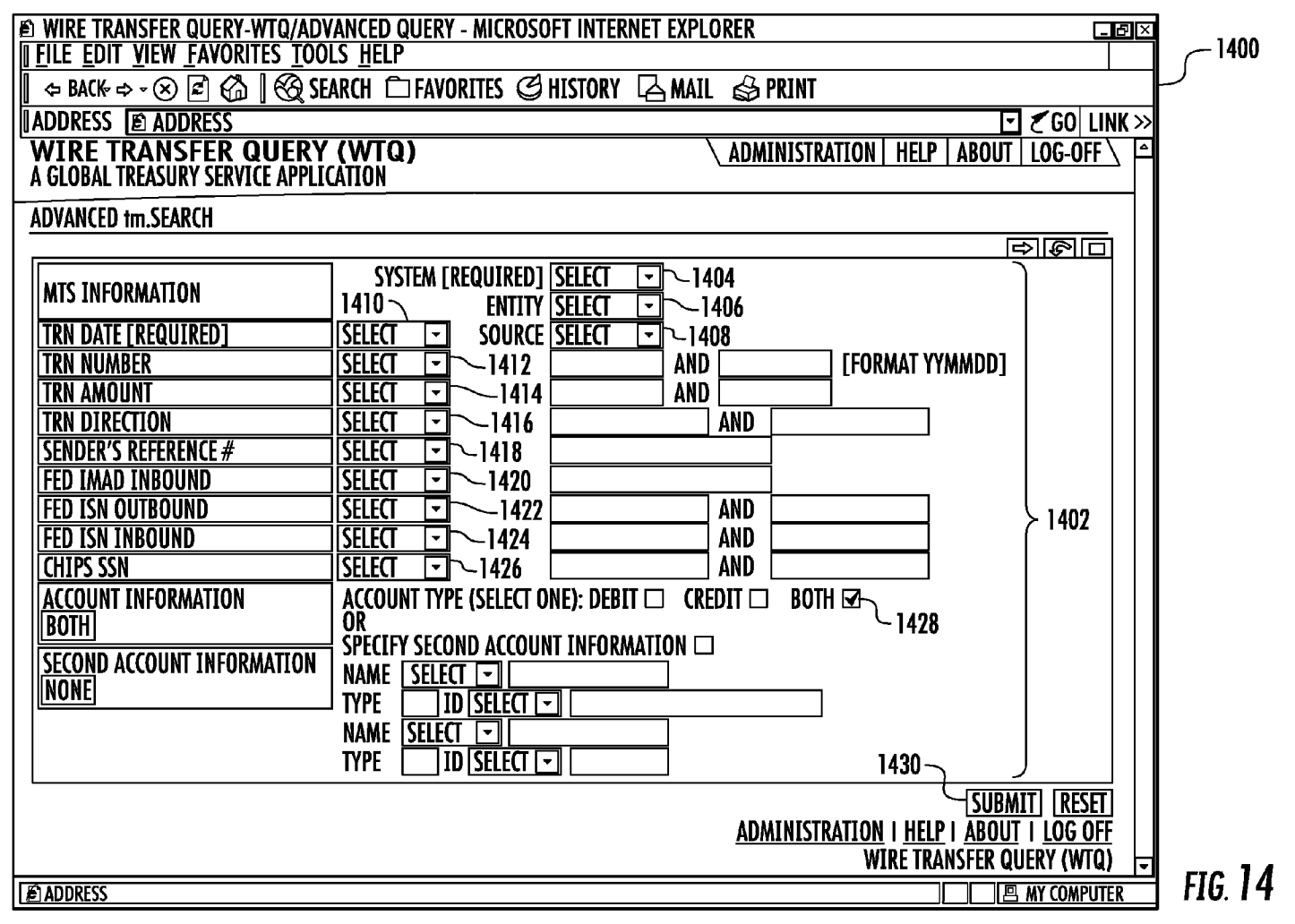

FIGS. 11A, 11B, 11C, and 11D are a flow chart of a method 1100 of operation of a query application, such as a WTQ application, in accordance with an embodiment of the present invention. The WTQ application may be the query application 106 in FIG. 1. The transaction query process may be done within a user's HTTP session context. In block 1102, a user may enter search parameters in a transaction query page. An example of a transaction query page 1400 is shown in FIG. 14. The transaction query page may be a WTQAdvancedQuery.jsp Java Server Page to present the user with a set of standard HTML input boxes 1402. Each box 1402 may represent a different search parameter, all built within a HTML form. The advanced query screen or page layout may be part of the presentation layer 500 (FIG. 5) and may contain logic to dynamically redefine select box option's based on options previously selected by the user. For example, if the user selects a particular system in the drop down menu or box 1404 of FIG. 14, then only a list of specific entities or transaction sources associated with the selected system in box 1404 may be presented in the ENTITY select drop down menu or box 1406 and a SOURCE select box 1408. This type of logic, as well as logic that controls parameter validation in block 1104 (FIG. 11A), may be contained within a WTQQueryPageJavaScriptLibrary.js that may be in the client layer 400 (FIG. 4).

The transaction query page 1400 in FIG. 14 may include a plurality of fields 1402 for the user to enter search parameters, such as the type of money transfer system 1404 and a transaction date 1410. In addition, the transaction query page 1400 may include fields to enter a transaction number 1412, a transaction amount 1414, a transaction direction 1416, sender's reference number 1418, input message accountability data for any messages sent from a bank to the Federal Reserve (FED IMAD INBOUND) 1420, an input message sequence number for any messages received from the Federal Reserve (FED ISN INBOUND) 1424, an input sequence message number for any messages sent from a bank to the Federal Reserve (FED ISN OUTBOUND) 1422, a clearing house interbank payment system (CHIPS) message sequence number (CHP SSN) 1426 and account information 1428.

After the user enters the transaction selection parameters, the user may submit the query in block 1106 (FIG. 11A) and start the search process by depressing the search submit button 1430 in FIG. 14. In block 1108 (FIG. 11A), a search of the message table databases 1110 may be performed. Control of the method 1100 may be transferred to a WTQTrnSummary.jsp Java Server Page in the presentation layer 500. Logic, both within session context and contained within a TRNSummary JavaBean 606 may execute calls that may form a TRNQueryData structure 724 and a TRNQuery object 720 which may be part of the database access layer 700 as shown in FIGS. 7 and 8. The TRNQuery 720 may perform the database query or search by forming a SQL (Structured Query Language) string in block 1108 (FIG. 11 A), submitting to the remote database 1110 and waiting for a response.

The search results may be returned in block 1112. The search results may be returned within a result set that may be copied into dynamic arrays contained within the TRNQuery object 720 that may be part of a TRNSummary 606 context in the interface or JavaBean layer 600. An example of a transaction summary page 1500 is shown in FIG. 15. The array types may match the display columns found in WTQTrnSummary.jsp, such as, but not limited to, message TRN reference number, source, direction, entity, activity, credit/debit accounts, amount, etc. The display column design and layout may be part of a specific GUI in the presentation and client layers 500 and 400, respectively. Display column titles 1502 (FIG. 15) may each contain a link that controls the sorting of the display based on the column selected. Sorting may be accomplished on the server side without the need of performing a new database query.

Typically, the information displayed in the WTQTrnSummary.jsp columns may require a complex SQL join of multiple tables. An indicator in the software, such as a msg_dx indicator 1113 (FIG. 11A), may control whether a query may be built for a consolidated table (msg_dx true) or a table join (msg_dx false) that contains the appropriate values corresponding to the search parameters. As a means to enhance performance, special query tables or table joins may be created that contain information sought by users on a recurring basis from several different tables. Searching a single consolidated table takes less database resource and time than searching several tables in a multi-table join.

Logic within WTQTrnSummary.jsp, may dynamically build the HTML table entries for each transaction set (its row of values across the display columns) in the summary page 1500 (FIG. 15). A dynamic HTML link may be created for each message transaction ID (TRN ID) or transaction reference number 1504. The dynamic link allows the user to select a specific message transaction.

Figure 16:
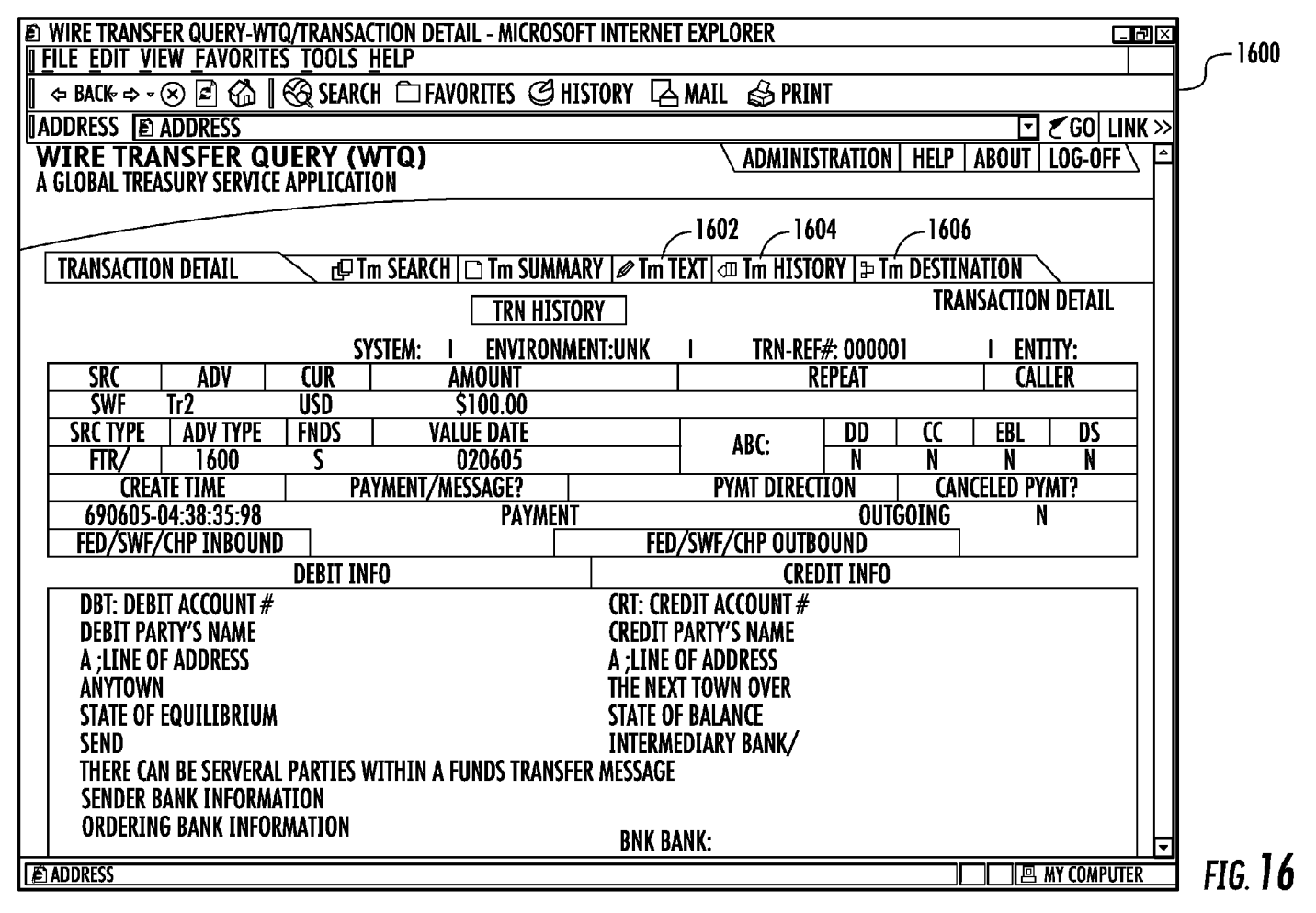

Referring back to FIG. 11A, in block 1114, a determination may be made whether the search produced a single result or a single transaction. If only a single transaction resulted, a transaction detail page, WTQDetail.jsp, may be displayed to the user in block 1116. An example of a transaction detail page 1600 is shown in FIG. 16. If more than one transaction was found to match the search parameters, the transaction summary page 1500 (FIG. 15), WTQTrnSummary.jsp, may be presented to the user in Block 1115.

In block 1118, the user may modify his search parameters by returning to the transaction query page in block 1102. Logic exists in the method 1100 to restore the previous search parameters when the user goes back to the WTQAdvancedQuery.jsp page or transaction query page. The user may modify one or more of the search parameters without re-entering all the common search parameters again.

Figure 11A:
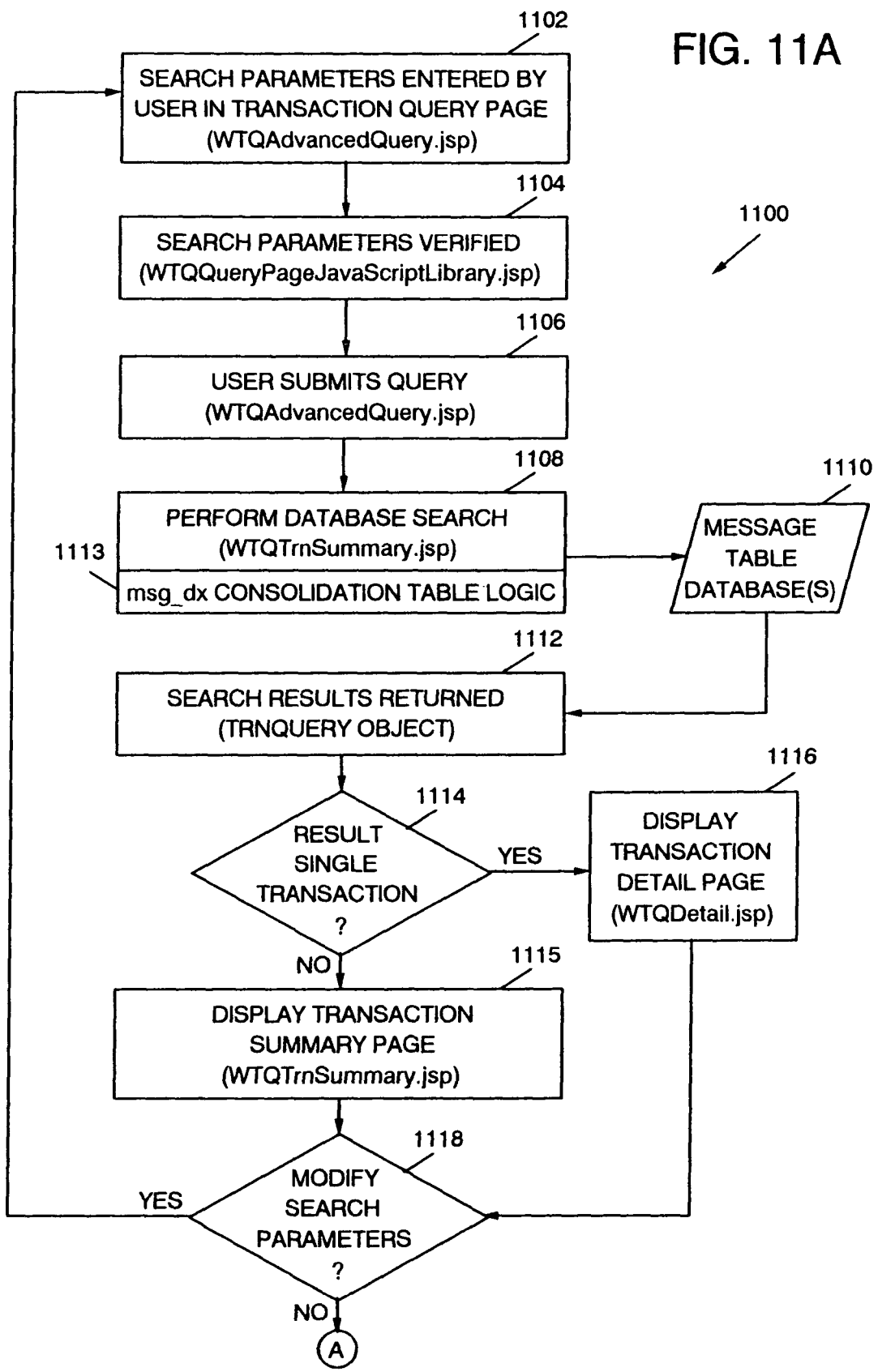
FIGS. 11A, 11B, 11C, and 11D are a flow chart of a method of operation of a query application, such as a WTQ application, in accordance with an embodiment of the present invention.
Figure 11B:
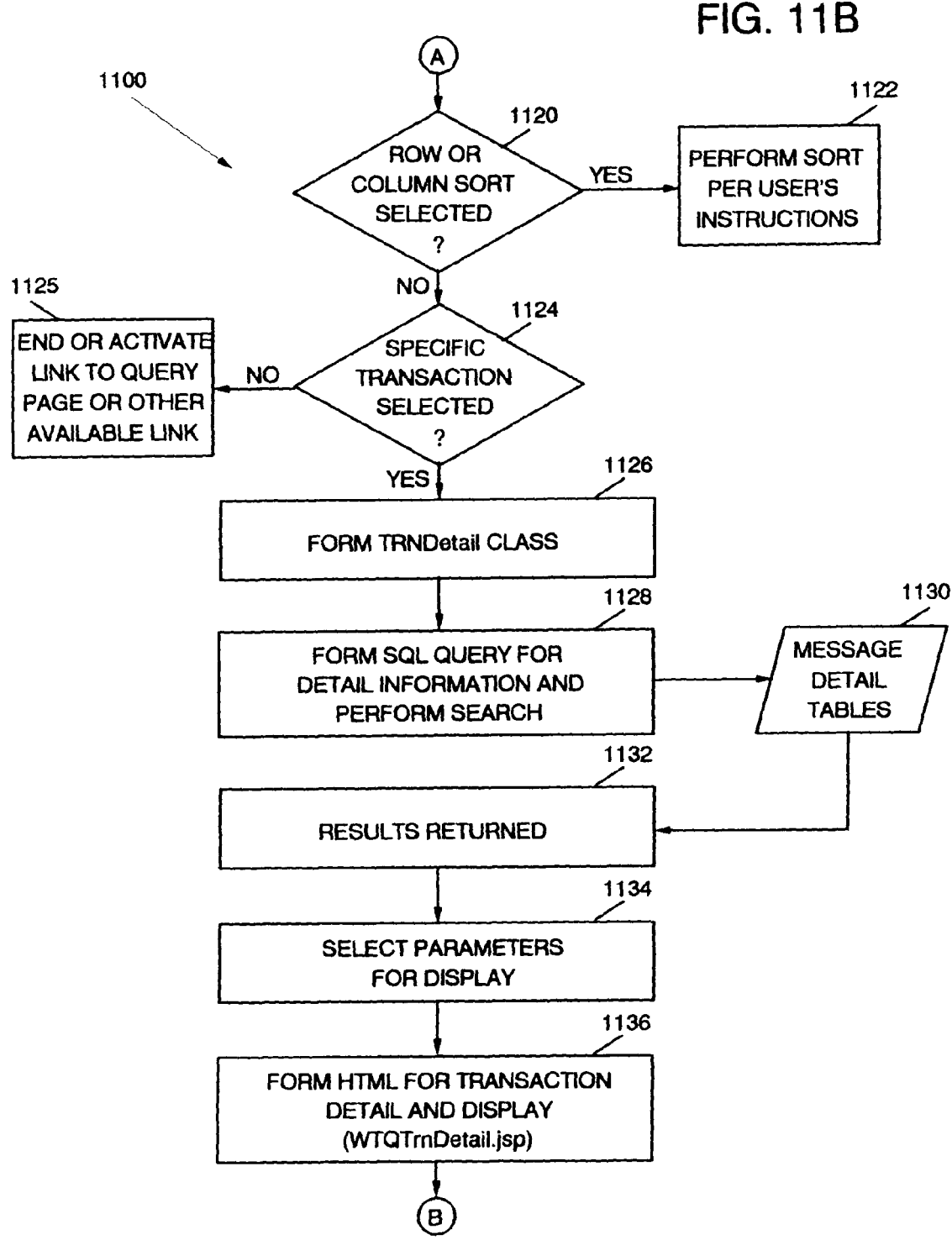

A user may be given the option to sort the results in block 1120 (FIG. 11B). If the user selects to sort the results, the sort may be performed according to the user's instructions in block 1122. If the user does not elect to sort the results in block 1120, the method 1100 may advance to block 1124. In block 1124, the user may select a given TRN ID or transaction reference numeral 1504 from the WTQTrnSummary.jsp display 1500 (FIG. 15). If the user does not select a specific transaction in block 1124, the method 1100 may end or the user may activate another available link in the transaction summary page 1500 (FIG. 15) in block 1125 (FIG. 11B). If the user selects a specific transaction in block 1124, a TRNDetail class may be formed in block 1126 (FIG. 11B). The method 1100 may pass control to a WTQTrnDetail.jsp Java Server Page. The WTQTrnDetail.jsp builds the HTML by calling routines within the TRNDetail Javabean. In block 1128, SQL queries for detail information may be formed and a search executed. The TRN ID of the selected message may be passed to a TRNDetail data structure which may form MSG_msg, MSG_cr and MSG_dr data objects. Each of these rgwdbaccess Java package objects may form and execute a SQL command to a remote database 1130 or databases for information specific to its table. Routines within the TRNDetail data structure may map specific values from the result sets that are returned from these database calls. The results of the searches may be returned in block 1132. Parameters may be selected by the user for display in block 1134. In block 1136, a HTML may be formed for the selected transaction detail and displayed in a transaction detail page, WTQTrnDetail.jsp. An example of a transaction detail page 1600 is shown in FIG. 16.

The transaction detail page 1600 may convey more information about a transaction that is not contained in data presented in the transaction summary page 1500 (FIG. 15). Wire transfers follow a common form that is specific to the entity that controls the transfer of money and messages between banks. Message forms are specific to the U.S. Federal Reserve Bank (FedWire), Society for Worldwide Interbank Financial Telecommunication (S.W.I.F.T), Clearing House InterBank Payment System (C.H.I.P.S) and in some cases specific internal bank formats. Typically, wire transfer systems may map information from these specific forms into a common internal form for processing purposes. WTQTrnDetail.jsp may incorporate the logic to display information found in the common wire system processing form. This common display form may be part of a predetermined presentation or GUI layer 500 (FIG. 5).

Figure 11C:
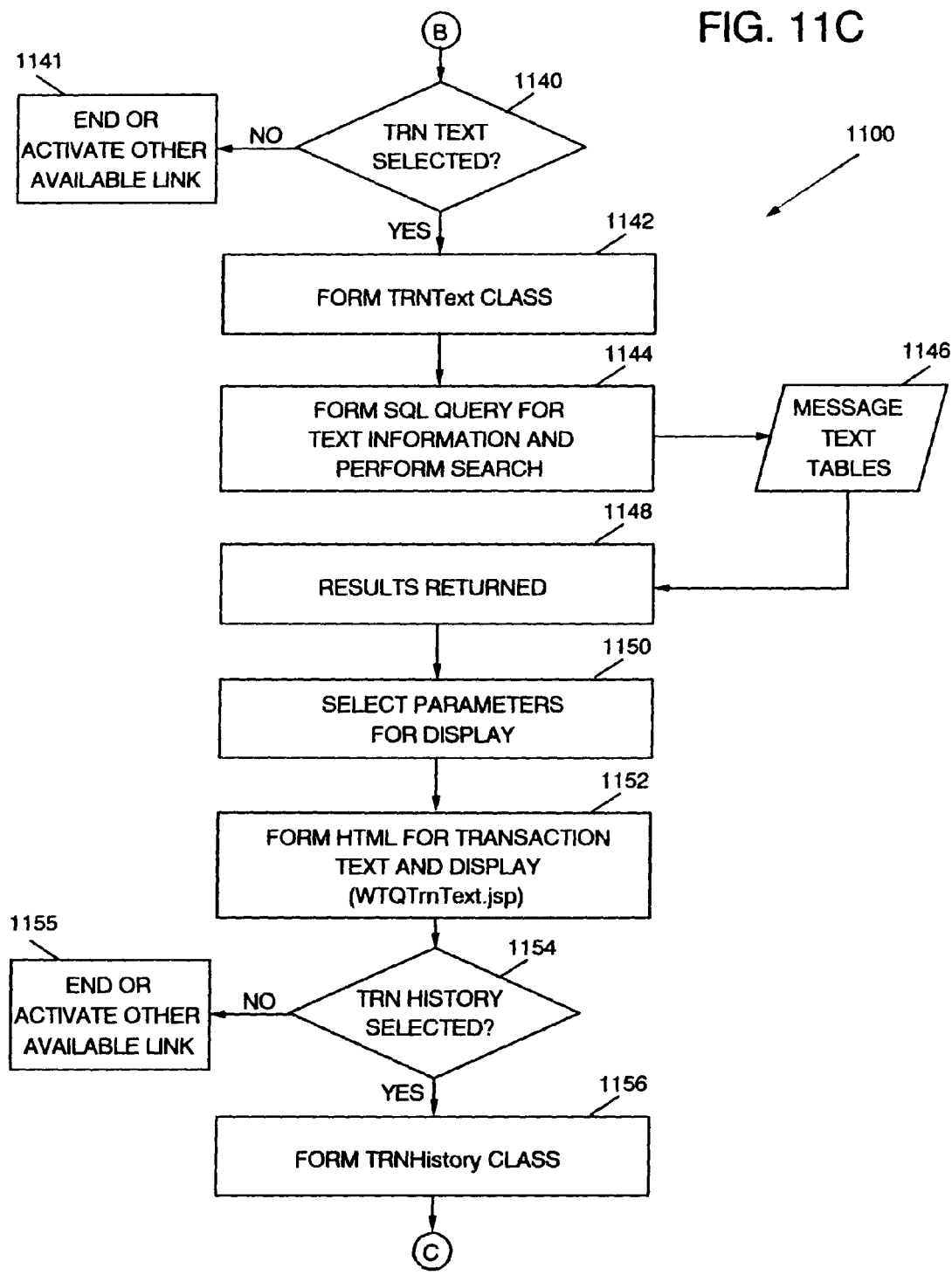
Figure 17:
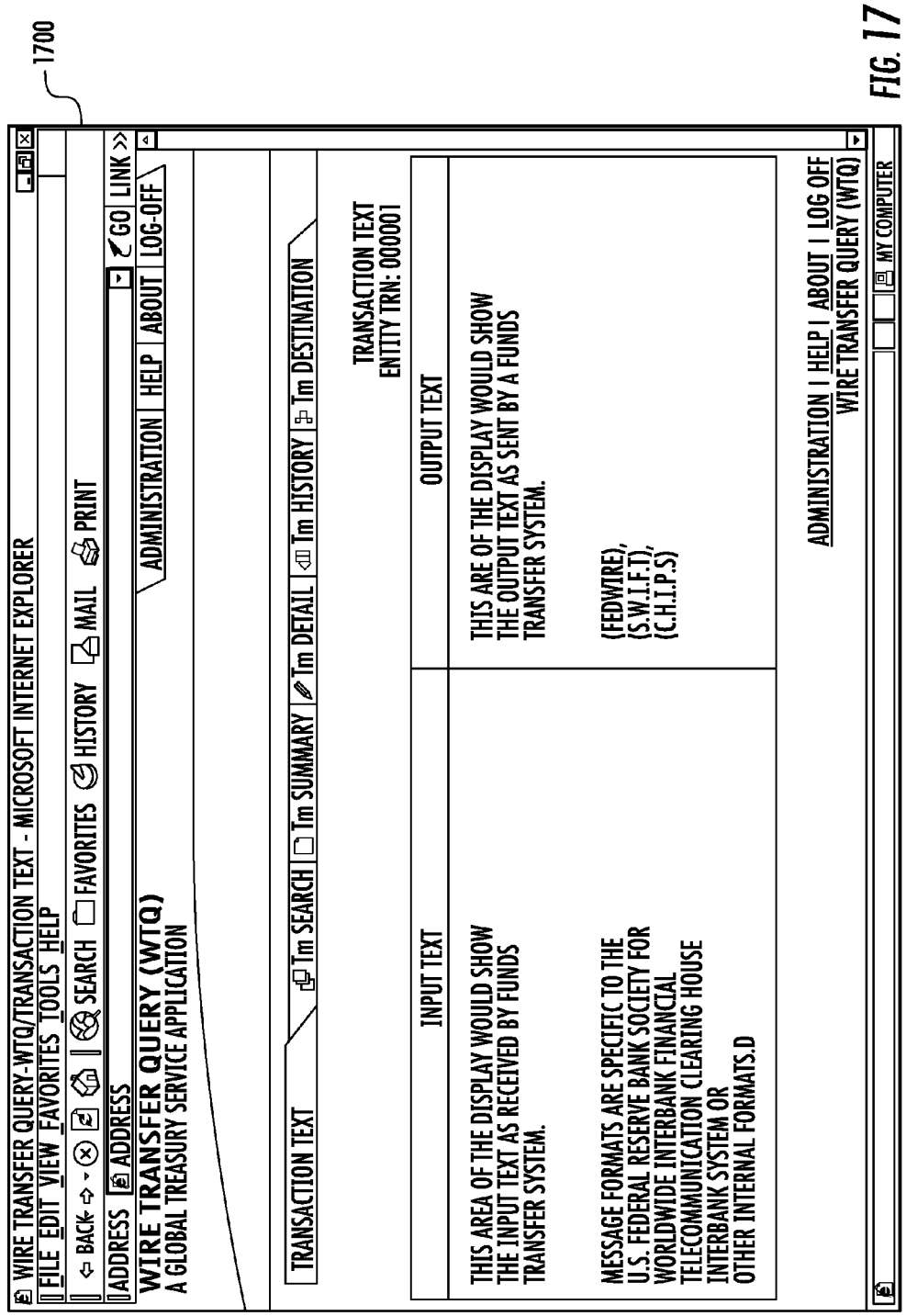
FIG. 17 is an exemplary GUI, web page or screen shot of transaction text page that may be generated by a WTQ application in accordance with an embodiment of the present invention.
Figure 18:
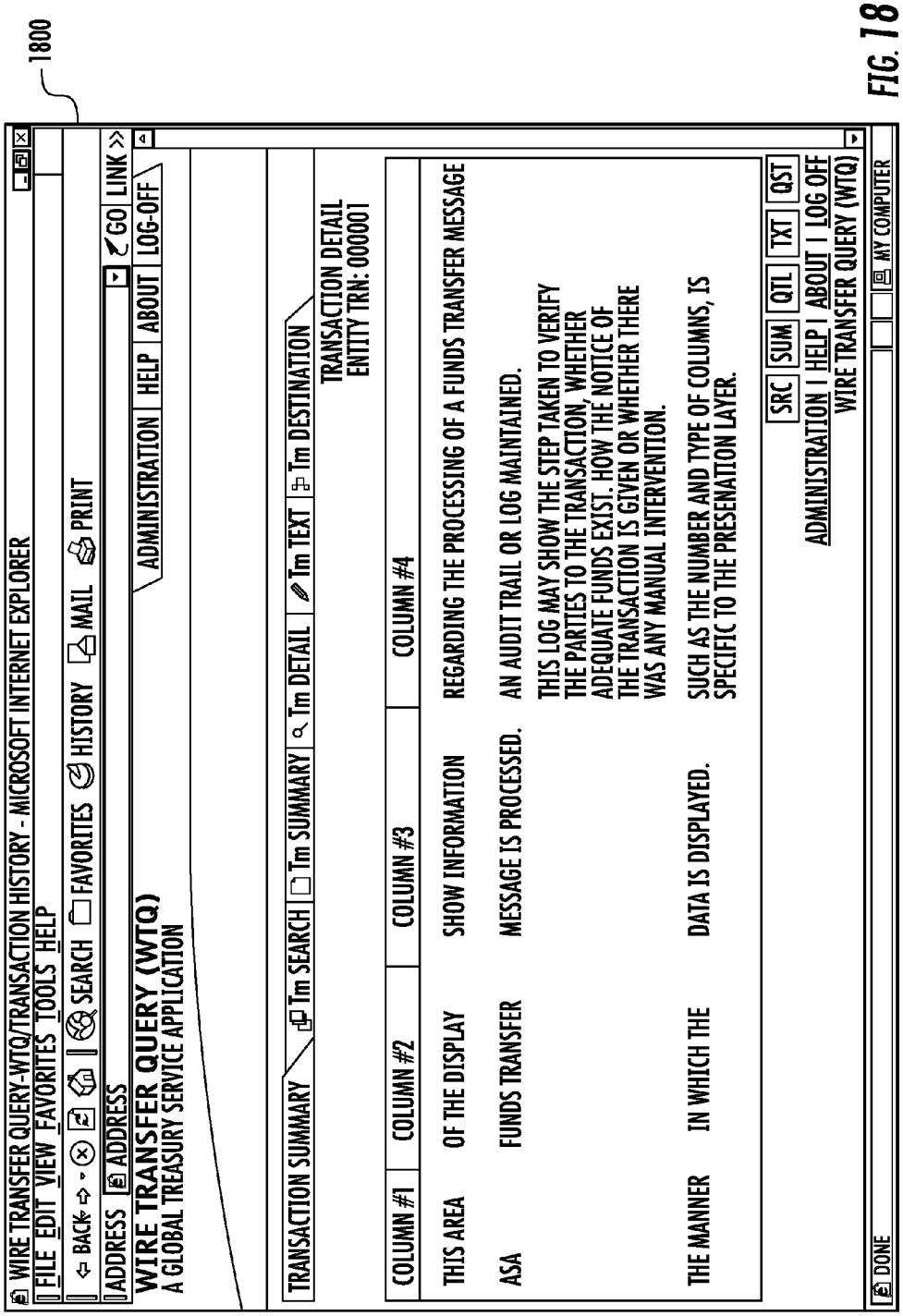
FIG. 18 is an exemplary GUI, web page or screen shot of a transaction history page that may be generated by a WTQ application in accordance with an embodiment of the present invention.

The WTQTrnDetail.jsp display or transaction detail page 1600 (FIG. 16) may contain graphical icons that permit the user to select the full text of the message (WTQTrnText.jsp), trn text icon 1602, its processing history (WTQTrnHistory.jsp), trn history icon 1604, and a log of its delivery destinations (WTQTrnDest.jsp), trn destination icon 1606. The user may select to display the full text of a transaction message in block 1140 (FIG. 11C). Alternatively, the user may end the session or select another link on the transaction detail page in block 1141. If the user selects to display the full text of a transaction message in block 1140, a TRNText class may be formed in block 1142. In block 1144, a SQL query may be formed for text information and a search may be performed of message text tables 1146. A WTQTrnText.jsp data structure may build the HTML by calling routines within a TRNText JavaBean that may create a MSG_text object. The MSG_text object may build and execute a SQL command to a remote database for information specific to the Message Text table 1146. Routines within TRNText may map values from result sets returned from the database calls. The search results may be returned in block 1148 and parameters may be selected for display in block 1150. These values may make up the specific presentation within a transaction text page, WTQTrnText.jsp. The HTML may be formed for the transaction text page and the page displayed in block 1152. An example of a transaction text page 1700 is shown in FIG. 17. The transaction text page 1700 may include input text information as received by a funds transfer system and output text information as sent by a funds transfer system. A similar framework may be used to generate a transaction history page 1800 in FIG. 18, WTQTrnHistory.jsp, TRNHist, MSG_hist and a transaction destination page 1900 in FIG. 19, WTQTrnDest.jsp, TRNDest and MSG_dest.

In block 1154 (FIG. 11C), a user may select to display a transaction history for a selected transaction. Alternatively, the user may end the session or select another available link in block 1155. In block 1156, a transaction history class may be formed. In block 1158 (FIG. 11D), a SQL query may be formed for history information and a search may be performed of message history tables 1160. The search results may be returned in block 1162. Parameters may be selected for display in block 1164. In block 1166, a HTML may be formed for the transaction history and the transaction history page 1800 (FIG. 18), WTQTrnHist.jsp may be displayed in block 1166. The transaction history page 1800 may display information regarding the processing of a funds transfer message as the message is processed. An audit trail or log may be displayed. The log may show steps taken to verify the parties to the transaction, whether adequate funds existed, how notice of the transaction was given or whether there was manual intervention. The manner in which the data may be displayed may be specified in the presentation layer 500 (FIG. 5).

Figure 11D:
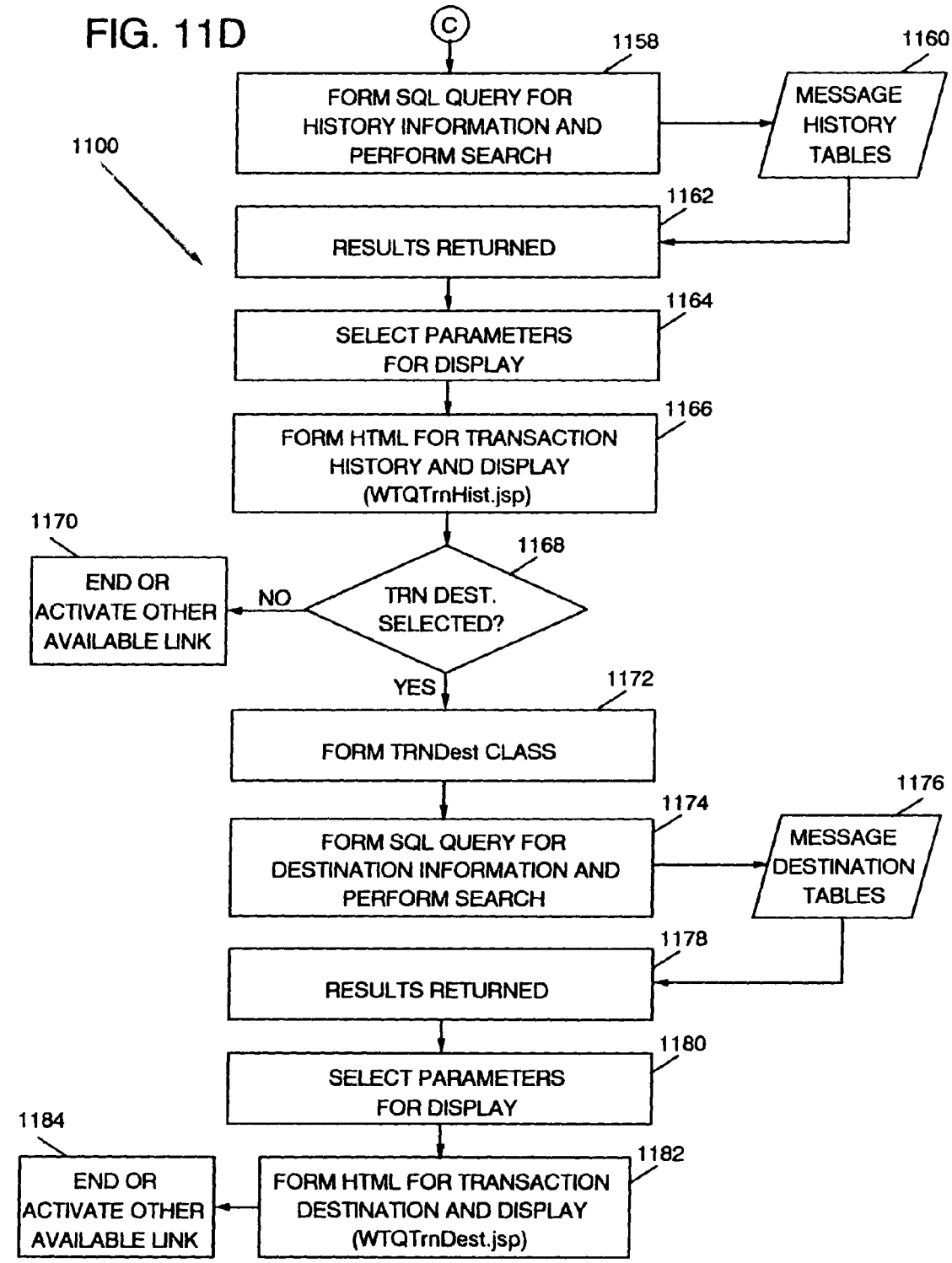
Figure 19:
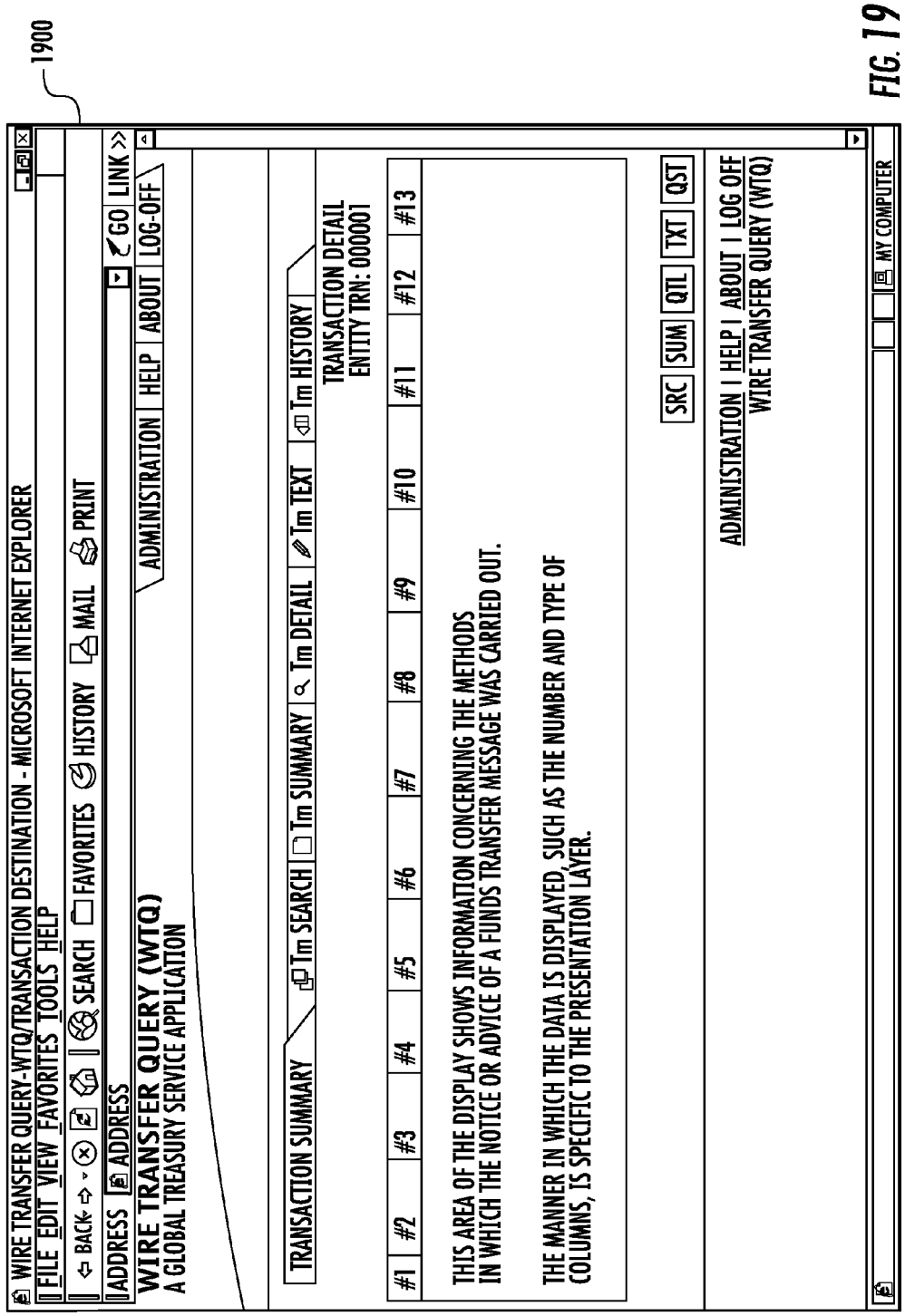
FIG. 19 is an exemplary GUI, web page or screen shot of a transaction destination page that may be generated by a WTQ application in accordance with an embodiment of the present invention.

In block 1168, a user may select to display a transaction destination page 1900 (FIG. 19). Alternatively, the user may end the session or activate another available link in block 1170. If the user elects to display the transaction destination page 1900, a TRNDest class may be formed in block 1172 (FIG. 11D). In block 1174, a SQL query may be formed and a search may be performed of message destination tables 1176. The results of the search may be returned in block 1178. The user may select parameters for display in block 1180. In block 1182, a HTML may be formed for the transaction destination page, WTQTrnDest.jsp. The transaction destination page 1900 may display information concerning the methods in which notice or advice of a finds transfer message was carried out. The user may end the session or select another link in block 1184.

Figure 12A:
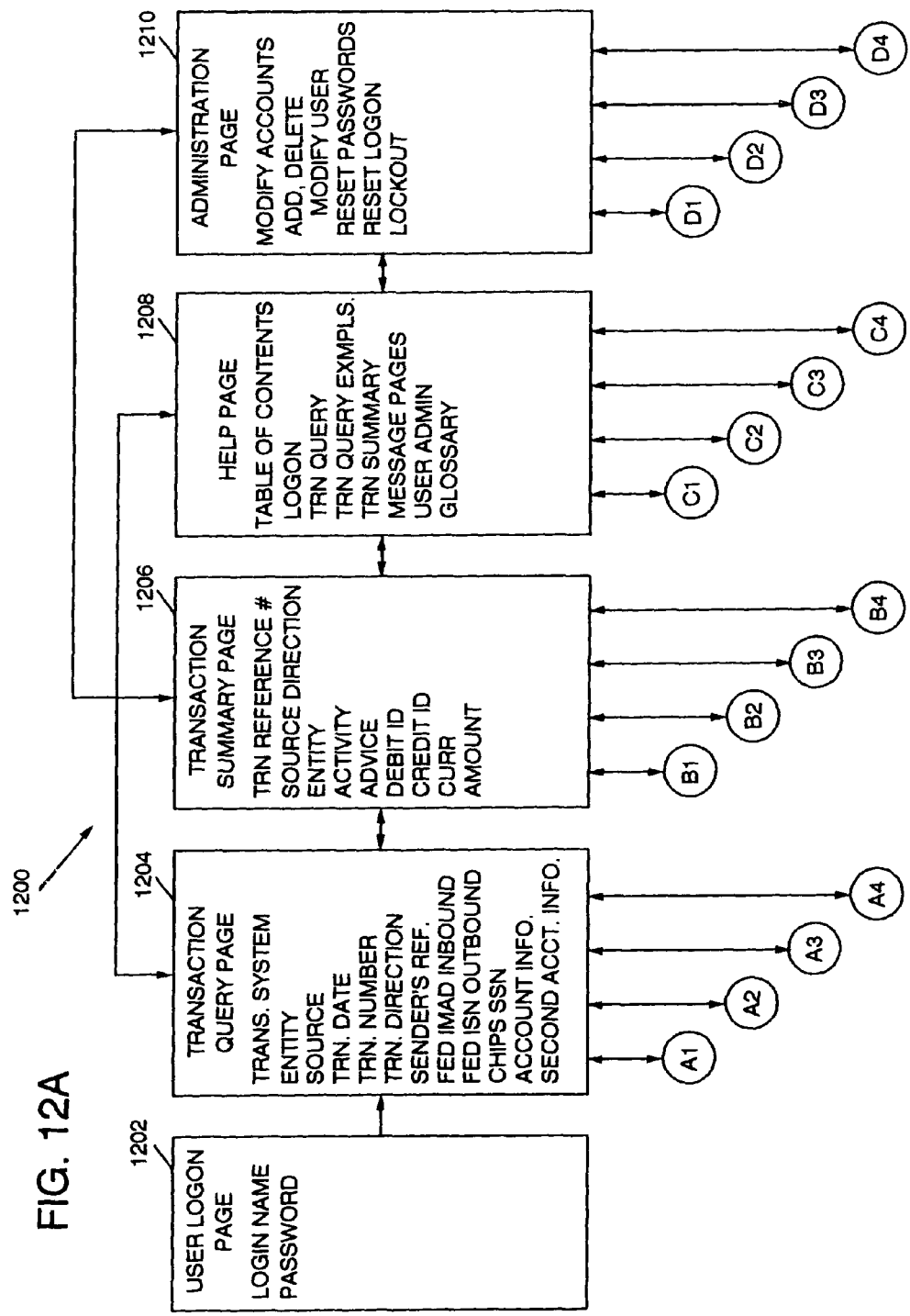
FIGS. 12A and 12B are a flow chart illustrating a sequence of graphical user interfaces (GUI), web pages or computer monitor screens that may be generated by a WTQ application in accordance with an embodiment of the present invention.
Figure 12B:
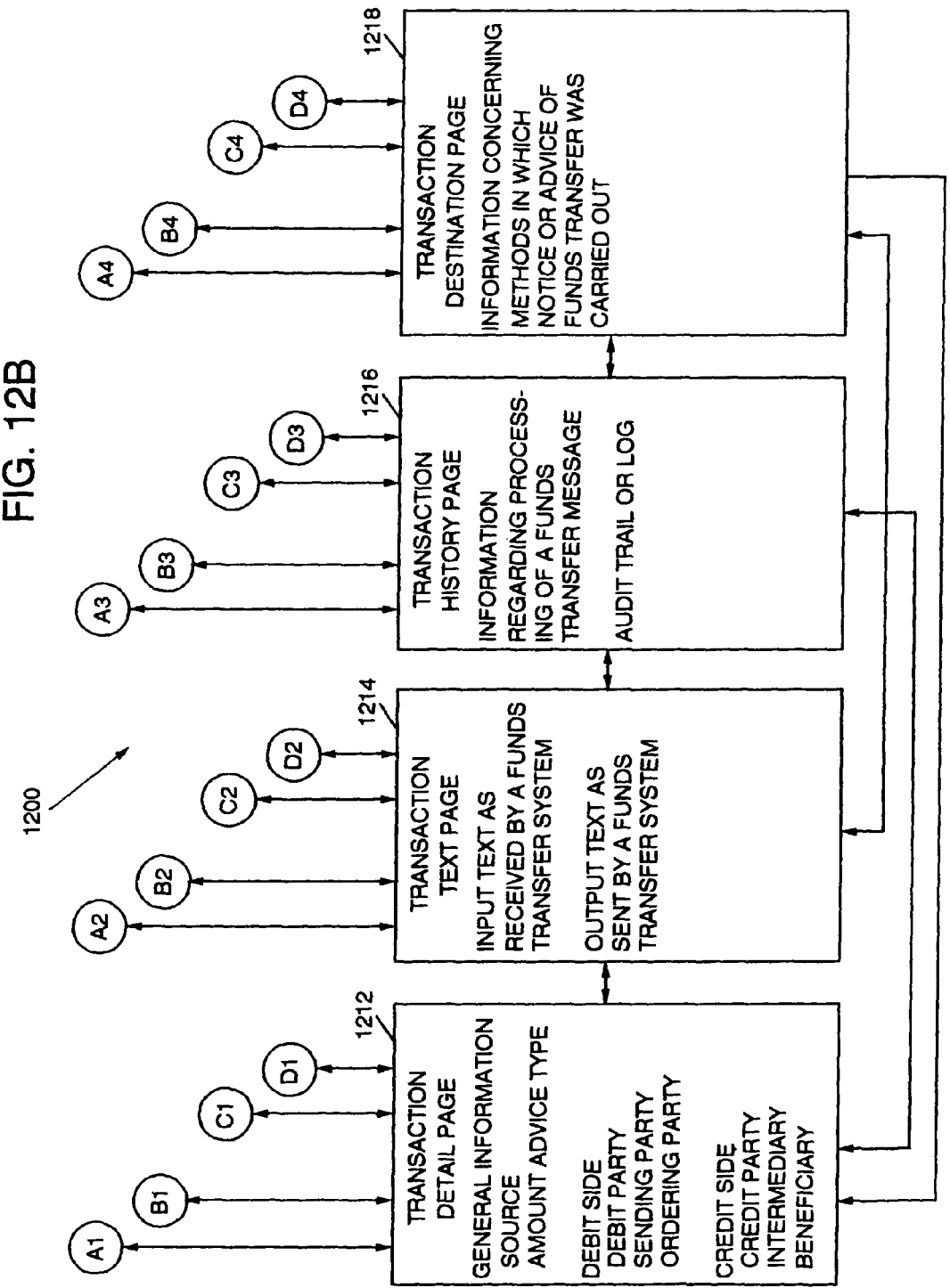

FIGS. 12A and 12B are a flow chart 1200 illustrating a sequence of graphical user interfaces (GUI), web pages or computer monitor screens that may be generated by the WTQ application in accordance with an embodiment of the present invention. The GUIs may be part of the presentation layer 500 (FIG. 5). The web pages are similar to those discussed with respect to FIGS. 13-19. As shown in FIGS. 13-19, the web pages may contain fanciful graphics for conveying the "look and feel" for a specific presentation GUI. A summary of the features provided by each page is also provided within the respective pages. The pages may include a user logon page 1202 similar to page 1300 of FIG. 13, a transaction query page 1204 similar to page 1400 of FIG. 14, a transaction summary page 1206 similar to page 1500 of FIG. 15, a help page 1208 and an administration page 1210. The web pages of the WTQ application may further include a transaction detail page 1212 similar to page 1600 of FIG. 16, a transaction text page 1214 similar to page 1700 of FIG. 17, a transaction history page 1216 similar to page 1800 of FIG. 18 and a transaction destination page 1218 similar to page 19 of FIG. 19. The flow chart 1200 shows how the different web pages may be linked together to access the query application and control the presentation of the results of any queries or database searches.

While the present invention has been described with respect to a wire transfer query (WTQ), the present invention has broad applicability and may be used for any type of query to retrieve information from a database or other storage medium.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system to retrieve information, comprising:
a processor; and
a query application operable on the processor to retrieve selected information from one or more databases, wherein the query application includes:
a client layer,
a presentation layer to interface with the client layer,
a database access layer, and
an interface layer to interface between the presentation layer and the database access layer.

2. A system to retrieve information, comprising:
a processor; and
a query application operable on the processor to retrieve selected information from one or more databases, wherein the query application includes:
a client layer,
a presentation layer to interface with the client layer,
a database access layer, and
an interface layer to interface between the presentation layer and the database access layer, wherein the transaction query application comprises a transaction query application to retrieve information related to financial transactions; and
a transaction query page generable by the transaction query application, wherein the transaction query page further comprises fields presentable to the user to enter at least one of a transaction number, a transaction amount, a transaction direction, input message accountability data for any messages sent from a bank to the Federal Reserve, an input message sequence number for any messages received from the Federal Reserve, an input sequence message number for any messages sent from a bank to the Federal Reserve, a clearing house interbank payment system message sequence number and account information.

3. A method to retrieve information, comprising:
accessing a query application on a processor to retrieve selected information from one or more databases, wherein the query application includes:
a client layer;
a presentation layer to interface with the client layer; and
a database access layer.

4. The system of claim 1, wherein the client layer comprises a structure to at least one of validate search parameters entered by a user, dynamically adjust predetermined search selection options in response to one or more search parameters previously entered by the user and retain a history of a prior set of search parameters entered by the user.

5. The system of claim 1, wherein the presentation layer comprises a structure to define at least one input query form page for a user to enter different search parameters and at least one output page to present search results to the user in response to the search parameters.

6. The system of claim 1, wherein the interface layer comprises a structure to form links to selected information in the one or more databases in response to search parameters entered by a user.

7. The system of claim 1, wherein the interface layer comprises a plurality of data objects to execute a search of the one or more databases in response to search parameters entered by a user in the presentation layer and to form a structure to display search results.

8. The system of claim 1, wherein the interface layer comprises a JavaBean layer.

9. The system of claim 1, wherein the database access layer comprises a structure and objects to form a structured query language (SQL) query in response to search parameters entered by a user, to access selected ones of a plurality of tables in the one or more databases corresponding to the SQL query, and to retrieve information corresponding to the SQL query.

10. The system of claim 1, further comprising an Internet type server to interface between a browser and the processor.

11. The system of claim 1, wherein the query application comprises a transaction query application to retrieve information related to financial transactions.

12. The system of claim 1, wherein the client layer, the presentation layer, the database layer, and the interface layer are all operable only on the processor.

13. The system of claim 2, further comprising a transaction summary page generable by operation of the transaction query application on the processor and displayable to the user including selected transaction data retrieved from the one or more databases for each transaction corresponding to the search parameters entered by the user on the transaction query page.

14. The method of claim 3, wherein an interface layer interfaces between the database layer and the presentation layer.

15. The method of claim 3, wherein accessing the query application comprises directing a browser to the query application.

16. The method of claim 3, further comprising:
presenting an input query page to a user to enter different search parameters;
forming a query data object in response to the search parameters entered by the user;
executing a search of one or more databases based on the query data object; and
presenting results of the search to the user.

17. The method of claim 3, wherein the client layer, the presentation layer and the database access layer are only operable on the processor.

18. The system of claim 5, wherein the at least one input query page and the at least one output page are configurable for different users.

19. The system of claim 8, wherein the JavaBean layer comprises a plurality of Java Server Pages (.jsp's) that execute a search of the one or more databases in response to search parameters entered by a user and create hypertext mark-up language (HTML) structures displayable by a browser.

20. The system of claim 9, wherein the database access layer comprises a structure and objects to establish links between data in the selected ones of the plurality of tables related to the SQL query.

21. The system of claim 11, wherein the one or more databases each comprise a plurality of relational transaction message tables.

22. The system of claim 11, further comprising a user logon page presentable to a user in response to a browser accessing the transaction query application.

23. The system of claim 11, further comprising a transaction query page displayable on a display and generable by operation of the transaction query application on the processor in response to a user accessing the transaction query application.

24. The system of claim 13, wherein the selected transaction information comprises a transaction reference number, a message source indicator, a message direction indicator, an activity type indicator, an advice type indicator, a credit identification indicator, a type of currency indicator and an amount of the wire transfer for each transaction.

25. The system of claim 13, further comprising a transaction detail page generable by operation of the transaction query application on the processor to present transaction data for a single transaction generated in response to only one transaction matching the search parameters entered on the transaction query page or in response to a user selecting one transaction from a plurality of transactions listed on the transaction summary page.

26. The system of claim 23, wherein the transaction query page comprises a plurality of fields presentable to a user to enter transaction search parameters.

27. The system of claim 25, wherein the transaction data presented on the transaction detail page comprises debit information and credit information.

28. The system of claim 25, further comprising a transaction text page generable by operation of the transaction query application on the processor to present a text message stream of the single transaction.

29. The system of claim 25, further comprising a transaction history page generable by operation of the transaction query application on the processor to present a list of operations by a money transfer system in conducting the transaction.

30. The system of claim 25, further comprising a transaction destination page generable by operation of the transaction query application on the processor to present how a notice of funds transfer was delivered.

31. The system of claim 25, wherein the selected information comprises wire transfer data for any transactions corresponding to a query.

32. The system of claim 26, wherein the transaction query page comprises at least fields presentable to the user to enter a type of money transfer system and a transaction date.

* * * * *